US012646118B2

(12) United States Patent (10) Patent No.: US 12,646,118 B2
Lane (45) **Date of Patent: *Jun. 2, 2026**

(54) CONTEXTUAL SEARCHING

(71) Applicant: TRADING TECHNOLOGIES INTERNATIONAL, INC., Chicago, IL (US)

(72) Inventor: Richard Lane, Stamford, CT (US)

(73) Assignee: Trading Technologies International, Inc., Chicago, IL (US)

( * ) Notice: Subject to any disclaimer, the term of this patent is extended or adjusted under 35 U.S.C. 154(b) by 48 days.

This patent is subject to a terminal disclaimer.

(21) Appl. No.: 18/953,996

(22) Filed: Nov. 20, 2024

(65) Prior Publication Data

US 2025/0086715 A1     Mar. 13, 2025

Related U.S. Application Data

(63) Continuation of application No. 18/416,139, filed on Jan. 18, 2024, now Pat. No. 12,182,864, which is a continuation of application No. 17/404,631, filed on Aug. 17, 2021, now Pat. No. 11,922,499, which is a continuation of application No. 16/892,965, filed on Jun. 4, 2020, now Pat. No. 11,132,747, which is a (Continued)

(51) Int. Cl.
| | |
|---|---|
| *G06Q 40/04* | (2012.01) |
| *G06F 16/2457* | (2019.01) |
| *G06F 16/248* | (2019.01) |
| *G06F 16/9535* | (2019.01) |
| *G06F 3/0482* | (2013.01) |

(52) U.S. Cl.
CPC ....... *G06Q 40/04* (2013.01); *G06F 16/24575* (2019.01); *G06F 16/248* (2019.01); *G06F 16/9535* (2019.01); *G06F 3/0482* (2013.01)

(58) Field of Classification Search
CPC ...................................................... G06Q 40/04
See application file for complete search history.

(56) References Cited

U.S. PATENT DOCUMENTS

| | | |
|---|---|---|
| 10,706,468 B2 | 7/2020 | Lane |
| 2007/0061298 A1* | 3/2007 | Wilson .................. G06F 16/951 |

(Continued)

OTHER PUBLICATIONS

Global IP News, "Trading Technologies International applies for patent on contextual searching"; New Delhi (Year: 2017).

*Primary Examiner* — Edward Chang
(74) *Attorney, Agent, or Firm* — MCDONNELL BOEHNEN HULBERT & BERGHOFF LLP

(57) ABSTRACT

Contextual searches may be performed to identify subsets of search results from an organized dataset. Contextual searching may return search results based on a relevance of the results to a query or search terms. Characters may be input by users at a search field that may be used to define context filters for limiting the search results of the organized dataset. Triggering events may be received that may trigger the definition of context filters that may be used to obtain the subsets of search results from the organized dataset. The triggering event may be a delimiter in the character string, for example. The subset of search results may include a subset of tradeable objects that may be traded at an electronic exchange. The subset of search results may continue to be limited based on additional context filters defined from the search input at the search field.

20 Claims, 15 Drawing Sheets

Related U.S. Application Data continuation of application No. 14/816,560, filed on Aug. 3, 2015, now Pat. No. 10,706,468.

(56) References Cited

U.S. PATENT DOCUMENTS

| | | | | |
|---|---|---|---|---|
| 2009/0076899 | A1* | 3/2009 | Gbodimowo | G06Q 30/02 705/14.69 |
| 2014/0344114 | A1* | 11/2014 | Sriram | G06Q 30/0625 705/26.62 |
| 2017/0039638 | A1 | 2/2017 | Lane | |
| 2020/0302530 | A1 | 9/2020 | Lane | |

* cited by examiner

400

414

412

402    404    406    408    410

CONTEXTUAL SEARCHING

CROSS REFERENCE TO RELATED APPLICATIONS

This patent application is a continuation of U.S. application Ser. No. 18/416,139, filed Jan. 18, 2024, which is a continuation of U.S. application Ser. No. 17/404,631, filed Aug. 17, 2021, now U.S. Pat. No. 11,922,499, which is continuation of U.S. application Ser. No. 16/892,965, filed Jun. 4, 2020, now U.S. Pat. No. 11,132,747, which is a continuation of U.S. application Ser. No. 14/816,560, filed Aug. 3, 2015, now U.S. Pat. No. 10,706,468, the contents of each of which are hereby incorporated by reference for all purposes.

BACKGROUND

An electronic trading system generally includes a trading device in communication with an electronic exchange. The trading device receives information about a market, such as prices and quantities, from the electronic exchange. The electronic exchange receives messages, such as messages related to orders, from the trading device. The electronic exchange attempts to match quantity of an order with quantity of one or more contra-side orders.

The trading devices may display market data for tradeable objects that may be traded across multiple exchanges. In order to identify the appropriate tradeable objects for which market data may be displayed, users have to navigate through tradeable objects at multiple exchanges. When the user is unaware of the exchange at which the tradeable object may reside, the user may have to navigate the tradeable objects at several exchanges to find the correct tradeable object. As multiple tradeable objects may have a similar name or identifier, it may be difficult for users to appropriately identify the tradeable objects once the tradeable objects are found in a search.

BRIEF DESCRIPTION OF THE FIGURES

Certain embodiments are disclosed with reference to the following drawings.

Figure 1:
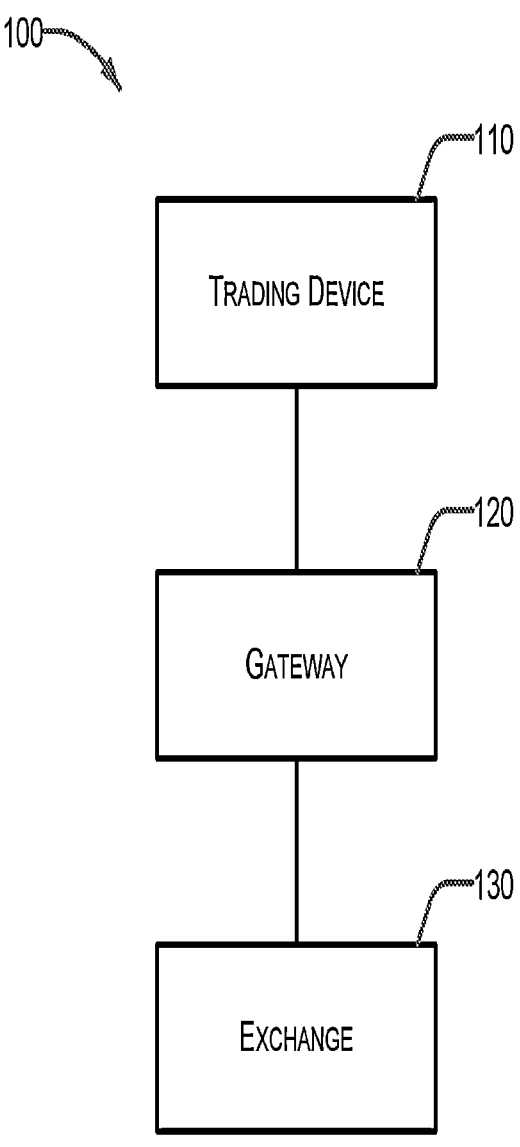
FIG. 1 illustrates a block diagram representative of an example electronic trading system in which certain embodiments may be employed.

Certain embodiments will be better understood when read in conjunction with the provided figures, which illustrate examples. It should be understood, however, that the embodiments are not limited to the arrangements and instrumentality shown in the attached figures.

DETAILED DESCRIPTION

Systems, methods, and apparatus are described for performing contextual searches. Contextual searching returns search results based on the context and/or search query provided by the user. The user provided context defines the search areas and/or topics of interest to the user. Search results are returned based on the overall context provided, and the returned search results are organized based on the order characters of the search string are received. The search results may further be organized based on the type, class or other hierarchy of the returned results. The contextual search may increase the accuracy of the search results based on the value of the results to the user.

As described herein, a character string that includes one or more characters may be received as a search input at a search field. A triggering event may be received that utilizes the definition of a context filter in order to obtain a subset of search results in an organized dataset. The triggering event may be a delimiter received as a part of the character string, for example. In response to receiving the triggering event, a context filter may be defined that identifies a context in the search input. The identified context may indicate a subset of search results to be retrieved from the organized dataset. The context, as used herein, provides the criteria and/or filters to be used to search a dataset. The subset of search results may include a subset of tradeable objects that may be traded at an electronic exchange. For example, the subset of search results may include a subset of financial products and/or a subset of contracts.

As the characters are entered into the search field, different contexts may be recommended for filtering the organized dataset to obtain the subset of search results. Each context may include or specify a context type. Different context types for tradeable objects may include exchanges, financial product types, financial products, and/or trading tools that may relate to the tradeable objects. The recommended contexts may be dynamically identified and/or updated in real-time as the user is entering characters in the search field. Certain contexts may be stored locally allowing for quick and dynamic updates and display. Certain contexts may be stored remotely, as they may be updated more frequently or may occupy more memory.

A query may be submitted to the organized dataset to retrieve the subset of search results that corresponds to the identified context in the context filter. The subset of search results from the organized dataset may be displayed in a user interface. The subset of search results may continue to be limited based on additional context filters that may be defined from the character string in the search input at the search field.

Different tools may be selected to display market data corresponding to the tradeable objects identified in the search results. The tools may include applications, such as trading applications, or display windows for displaying the market data from electronic exchanges. The market data may be received from the at least one electronic exchange and displayed in the tool. The tool may be a trading tool at a trading device.

Although this description discloses embodiments including, among other components, software executed on hardware, it should be noted that the embodiments are merely illustrative and should not be considered as limiting. For example, it is contemplated that any or all of these hardware and software components may be embodied exclusively in hardware, exclusively in software, exclusively in firmware, or in any combination of hardware, software, and/or firmware. Accordingly, certain embodiments may be implemented in other ways.

I. Brief Description of Certain Embodiments

Systems, methods, and apparatus are described for performing a contextual search. As described herein, one or more characters may be received as a search input at a search field. The one or more characters may include at least one delimiter. In response to receiving the at least one delimiter, a context filter may be defined that identifies a context in the search input. The context identified in the defined context filter may indicate a subset of search results to be retrieved from an organized dataset. A query may be submitted according to the context filter to retrieve the subset of search results from the organized dataset that corresponds to the identified context in the context filter. The subset of search results from the organized dataset may be displayed in a user interface.

The subset of search results may be further limited from the organized dataset based on at least one additional context filter defined from at least one or more additional characters that include an additional delimiter. The further limited subset of search results from the organized dataset may be displayed in a user interface.

A selection of a tool may be identified to generate a display of market data from at least one electronic exchange. The tool may include an application or a display window for displaying the market data from the at least one electronic exchange. The market data may be received from the at least one electronic exchange and displayed in the tool. The tool may be a trading tool at a trading device.

The context that is identified in the context filter may be associated with a context type. The context type may include electronic exchanges, financial product types, financial products, or tool types. The context type may be displayed to identify the context type associated with the context.

The subset of search results may include at least one of a subset of financial products or a subset of contracts. The search results may be provided via a user interface in an organized list.

An icon may be generated for the context filter in response to receiving the at least one delimiter. The icon may be displayed in the search field. The icon may allow a user to select or deselect the application of the context filter.

The one or more characters may include a plurality of characters. Each character of the plurality of characters may be received as the search input at the search field. Upon receiving each character of the plurality of characters, a plurality of contexts may be displayed in real-time for defining the context filter. The plurality of contexts may include the context that is identified in the context filter.

The embodiments described herein may be performed by a search engine. The search engine may reside at a trading device.

II. Example Electronic Trading System

FIG. 1 illustrates a block diagram representative of an example electronic trading system 100 in which certain embodiments may be employed. The system 100 includes a trading device 110, a gateway 120, and an exchange 130. The trading device 110 is in communication with the gateway 120. The gateway 120 is in communication with the exchange 130. As used herein, the phrase "in communication with" encompasses direct communication and/or indirect communication through one or more intermediary components. The exemplary electronic trading system 100 depicted in FIG. 1 may be in communication with additional components, subsystems, and elements to provide additional functionality and capabilities without departing from the teaching and disclosure provided herein.

In operation, the trading device 110 may receive market data from the exchange 130 through the gateway 120. A user may utilize the trading device 110 to monitor this market data and/or base a decision to send an order message to buy or sell one or more tradeable objects to the exchange 130.

Market data may include data about a market for a tradeable object. For example, market data may include the inside market, market depth, last traded price ("LTP"), a last traded quantity ("LTQ"), or a combination thereof. The inside market refers to the highest available bid price (best bid) and the lowest available ask price (best ask or best offer) in the market for the tradeable object at a particular point in time (since the inside market may vary over time). Market depth refers to quantities available at price levels including the inside market and away from the inside market. Market depth may have "gaps" due to prices with no quantity based on orders in the market.

The price levels associated with the inside market and market depth can be provided as value levels which can encompass prices as well as derived and/or calculated representations of value. For example, value levels may be displayed as net change from an opening price. As another example, value levels may be provided as a value calculated from prices in two other markets. In another example, value levels may include consolidated price levels.

A tradeable object is anything which may be traded. For example, a certain quantity of the tradeable object may be bought or sold for a particular price. A tradeable object may include, for example, financial products, stocks, options, bonds, future contracts, currency, warrants, funds derivatives, securities, commodities, swaps, interest rate products, index-based products, traded events, goods, or a combination thereof. A tradeable object may include a product listed and/or administered by an exchange, a product defined by the user, a combination of real or synthetic products, or a combination thereof. There may be a synthetic tradeable object that corresponds and/or is similar to a real tradeable object.

An order message is a message that includes a trade order. A trade order may be, for example, a command to place an order to buy or sell a tradeable object; a command to initiate managing orders according to a defined trading strategy; a command to change, modify, or cancel an order; an instruction to an electronic exchange relating to an order; or a combination thereof.

The trading device 110 may include one or more electronic computing platforms. For example, the trading device 110 may include a desktop computer, hand-held device, laptop, server, a portable computing device, a trading terminal, an embedded trading system, a workstation, an algorithmic trading system such as a "black box" or "grey box" system, cluster of computers, or a combination thereof. As another example, the trading device 110 may include a single or multi-core processor in communication with a memory or other storage medium configured to accessibly store one or more computer programs, applications, libraries, computer readable instructions, and the like, for execution by the processor.

As used herein, the phrases "configured to" and "adapted to" encompass that an element, structure, or device has been modified, arranged, changed, or varied to perform a specific function or for a specific purpose.

By way of example, the trading device 110 may be implemented as a personal computer running a copy of X_TRADER®, an electronic trading platform provided by Trading Technologies International, Inc. of Chicago, Illinois ("Trading Technologies"). As another example, the trading device 110 may be a server running a trading application providing automated trading tools such as ADL®, AUTOSPREADER®, and/or AUTOTRADER™, also provided by Trading Technologies. In yet another example, the trading device 110 may include a trading terminal in communication with a server, where collectively the trading terminal and the server are the trading device 110.

The trading device 110 is generally owned, operated, controlled, programmed, configured, or otherwise used by a user. As used herein, the phrase "user" may include, but is not limited to, a human (for example, a trader), trading group (for example, a group of traders), or an electronic trading device (for example, an algorithmic trading system). One or more users may be involved in the ownership, operation, control, programming, configuration, or other use, for example.

The trading device 110 may include one or more trading applications. As used herein, a trading application is an application that facilitates or improves electronic trading. A trading application provides one or more electronic trading tools. For example, a trading application stored by a trading device may be executed to arrange and display market data in one or more trading windows. In another example, a trading application may include an automated spread trading application providing spread trading tools. In yet another example, a trading application may include an algorithmic trading application that automatically processes an algorithm and performs certain actions, such as placing an order, modifying an existing order, deleting an order. In yet another example, a trading application may provide one or more trading screens. A trading screen may provide one or more trading tools that allow interaction with one or more markets. For example, a trading tool may allow a user to obtain and view market data, set order entry parameters, submit order messages to an exchange, deploy trading algorithms, and/or monitor positions while implementing various trading strategies. The electronic trading tools provided by the trading application may always be available or may be available only in certain configurations or operating modes of the trading application.

A trading application may be implemented utilizing computer readable instructions that are stored in a computer readable medium and executable by a processor. A computer readable medium may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable storage media and to exclude propagating signals.

One or more components or modules of a trading application may be loaded into the computer readable medium of the trading device 110 from another computer readable medium. For example, the trading application (or updates to the trading application) may be stored by a manufacturer, developer, or publisher on one or more CDs or DVDs, which are then loaded onto the trading device 110 or to a server from which the trading device 110 retrieves the trading application. As another example, the trading device 110 may receive the trading application (or updates to the trading application) from a server, for example, via the Internet or an internal network. The trading device 110 may receive the trading application or updates when requested by the trading device 110 (for example, "pull distribution") and/or unrequested by the trading device 110 (for example, "push distribution").

The trading device 110 may be adapted to send order messages. For example, the order messages may be sent to through the gateway 120 to the exchange 130. As another example, the trading device 110 may be adapted to send order messages to a simulated exchange in a simulation environment which does not effectuate real-world trades.

The order messages may be sent at the request of a user. For example, a trader may utilize the trading device 110 to send an order message or manually input one or more parameters for a trade order (for example, an order price and/or quantity). As another example, an automated trading tool provided by a trading application may calculate one or more parameters for a trade order and automatically send the order message. In some instances, an automated trading tool may prepare the order message to be sent but not actually send it without confirmation from a user.

An order message may be sent in one or more data packets or through a shared memory system. For example, an order message may be sent from the trading device 110 to the exchange 130 through the gateway 120. The trading device 110 may communicate with the gateway 120 using a local area network, a wide area network, a wireless network, a virtual private network, a cellular network, a peer-to-peer network, a T1 line, a T3 line, an integrated services digital network ("ISDN") line, a point-of-presence, the Internet, a shared memory system and/or a proprietary network such as TTNET™ provided by Trading Technologies, for example.

The gateway 120 may include one or more electronic computing platforms. For example, the gateway 120 may be implemented as one or more desktop computer, hand-held device, laptop, server, a portable computing device, a trading terminal, an embedded trading system, workstation with a single or multi-core processor, an algorithmic trading system such as a "black box" or "grey box" system, cluster of computers, or any combination thereof.

The gateway 120 may facilitate communication. For example, the gateway 120 may perform protocol translation for data communicated between the trading device 110 and the exchange 130. The gateway 120 may process an order message received from the trading device 110 into a data format understood by the exchange 130, for example. Similarly, the gateway 120 may transform market data in an exchange-specific format received from the exchange 130 into a format understood by the trading device 110, for example.

The gateway 120 may include a trading application, similar to the trading applications discussed above, that facilitates or improves electronic trading. For example, the gateway 120 may include a trading application that tracks orders from the trading device 110 and updates the status of the order based on fill confirmations received from the exchange 130. As another example, the gateway 120 may include a trading application that coalesces market data from the exchange 130 and provides it to the trading device 110. In yet another example, the gateway 120 may include a trading application that provides risk processing, calculates implieds, handles order processing, handles market data processing, or a combination thereof.

In certain embodiments, the gateway 120 communicates with the exchange 130 using a local area network, a wide area network, a wireless network, a virtual private network, a cellular network, a peer-to-peer network, a T1 line, a T3 line, an ISDN line, a point-of-presence, the Internet, a shared memory system, and/or a proprietary network such as TTNET™ provided by Trading Technologies, for example.

The exchange 130 may be owned, operated, controlled, or used by an exchange entity. Example exchange entities include the CME Group, the London International Financial Futures and Options Exchange, the Intercontinental Exchange, and Eurex. The exchange 130 may include an electronic matching system, such as a computer, server, or other computing device, which is adapted to allow tradeable objects, for example, offered for trading by the exchange, to be bought and sold. The exchange 130 may include separate entities, some of which list and/or administer tradeable objects and others which receive and match orders, for example. The exchange 130 may include an electronic communication network ("ECN"), for example.

The exchange 130 may be an electronic exchange. The exchange 130 is adapted to receive order messages and match contra-side trade orders to buy and sell tradeable objects. Unmatched trade orders may be listed for trading by the exchange 130. Once an order to buy or sell a tradeable object is received and confirmed by the exchange, the order is considered to be a working order until it is filled or cancelled. If only a portion of the quantity of the order is matched, then the partially filled order remains a working order. The trade orders may include trade orders received from the trading device 110 or other devices in communication with the exchange 130, for example. For example, typically the exchange 130 will be in communication with a variety of other trading devices (which may be similar to trading device 110) which also provide trade orders to be matched.

The exchange 130 is adapted to provide market data. Market data may be provided in one or more messages or data packets or through a shared memory system. For example, the exchange 130 may publish a data feed to subscribing devices, such as the trading device 110 or gateway 120. The data feed may include market data.

The system 100 may include additional, different, or fewer components. For example, the system 100 may include multiple trading devices, gateways, and/or exchanges. In another example, the system 100 may include other communication devices, such as middleware, firewalls, hubs, switches, routers, servers, exchange-specific communication equipment, modems, security managers, and/or encryption/decryption devices.

II. Expanded Example Electronic Trading System

Figure 2:
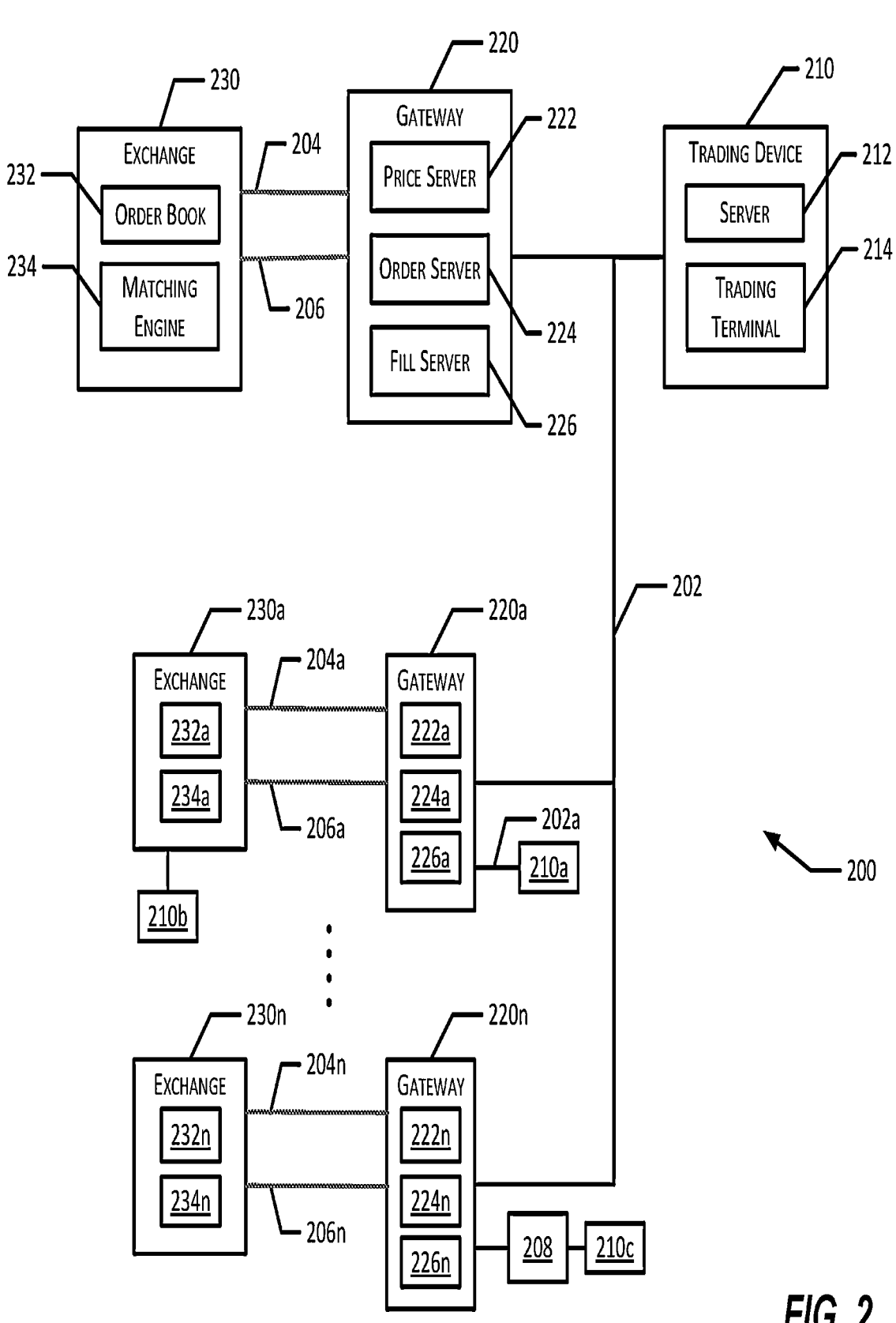
FIG. 2 illustrates a block diagram of another example electronic trading system in which certain embodiments may be employed.

FIG. 2 illustrates a block diagram of another example electronic trading system 200 in which certain embodiments may be employed. In this example, a trading device 210 may utilize one or more communication networks to communicate with a gateway 220 and exchange 230. For example, the trading device 210 utilizes network 202 to communicate with the gateway 220, and the gateway 220, in turn, utilizes the networks 204 and 206 to communicate with the exchange 230. As used herein, a network facilitates or enables communication between computing devices such as the trading device 210, the gateway 220, and the exchange 230.

The following discussion generally focuses on the trading device 210, gateway 220, and the exchange 230. However, the trading device 210 may also be connected to and communicate with "n" additional gateways (individually identified as gateways 220a-220n, which may be similar to gateway 220) and "n" additional exchanges (individually identified as exchanges 230a-230n, which may be similar to exchange 230) by way of the network 202 (or other similar networks). Additional networks (individually identified as networks 204a-204n and 206a-206n, which may be similar to networks 204 and 206, respectively) may be utilized for communications between the additional gateways and exchanges. The communication between the trading device 210 and each of the additional exchanges 230a-230n need not be the same as the communication between the trading device 210 and exchange 230. Generally, each exchange has its own preferred techniques and/or formats for communicating with a trading device, a gateway, the user, or another exchange. It should be understood that there is not necessarily a one-to-one mapping between gateways 220a-220n and exchanges 230a-230n. For example, a particular gateway may be in communication with more than one exchange. As another example, more than one gateway may be in communication with the same exchange. Such an arrangement may, for example, allow one or more trading devices 210 to trade at more than one exchange (and/or provide redundant connections to multiple exchanges).

Additional trading devices 210a-210n, which may be similar to trading device 210, may be connected to one or more of the gateways 220a-220n and exchanges 230a-230n. For example, the trading device 210a may communicate with the exchange 230a via the gateway 220a and the networks 202a, 204a and 206a. In another example, the trading device 210b may be in direct communication with exchange 230a. In another example, trading device 210c may be in communication with the gateway 220n via an intermediate device 208 such as a proxy, remote host, or WAN router.

The trading device 210, which may be similar to the trading device 110 in FIG. 1, includes a server 212 in communication with a trading terminal 214. The server 212 may be located geographically closer to the gateway 220 than the trading terminal 214 in order to reduce latency. In operation, the trading terminal 214 may provide a trading screen to a user and communicate commands to the server 212 for further processing. For example, a trading algorithm may be deployed to the server 212 for execution based on market data. The server 212 may execute the trading algorithm without further input from the user. In another example, the server 212 may include a trading application providing automated trading tools and communicate back to the trading terminal 214. The trading device 210 may include additional, different, or fewer components.

In operation, the network 202 may be a multicast network configured to allow the trading device 210 to communicate with the gateway 220. Data on the network 202 may be logically separated by subject such as, for example, by prices, orders, or fills. As a result, the server 212 and trading terminal 214 can subscribe to and receive data such as, for example, data relating to prices, orders, or fills, depending on their individual needs.

The gateway 220, which may be similar to the gateway 120 of FIG. 1, may include a price server 222, order server 224, and fill server 226. The gateway 220 may include additional, different, or fewer components. The price server 222 may process price data. Price data includes data related to a market for one or more tradeable objects. The order server 224 processes order data. Order data is data related to a user's trade orders. For example, order data may include order messages, confirmation messages, or other types of messages. The fill server collects and provides fill data. Fill data includes data relating to one or more fills of trade orders. For example, the fill server 226 may provide a record of trade orders, which have been routed through the order server 224, that have and have not been filled. The servers 222, 224, and 226 may run on the same machine or separate machines. There may be more than one instance of the price server 222, the order server 224, and/or the fill server 226 for gateway 220. In certain embodiments, the additional gateways 220a-220n may each includes instances of the servers 222, 224, and 226 (individually identified as servers 222a-222n, 224a-224n, and 226a-226n).

The gateway 220 may communicate with the exchange 230 using one or more communication networks. For example, as shown in FIG. 2, there may be two communication networks connecting the gateway 220 and the exchange 230. The network 204 may be used to communicate market data to the price server 222. In some instances, the exchange 230 may include this data in a data feed that is published to subscribing devices. The network 206 may be used to communicate order data to the order server 224 and the fill server 226. The network 206 may also be used to communicate order data from the order server 224 to the exchange 230.

The exchange 230, which may be similar to the exchange 130 of FIG. 1, includes an order book 232 and a matching engine 234. The exchange 230 may include additional, different, or fewer components. The order book 232 is a database that includes data relating to unmatched trade orders that have been submitted to the exchange 230. For example, the order book 232 may include data relating to a market for a tradeable object, such as the inside market, market depth at various price levels, the last traded price, and the last traded quantity. The matching engine 234 may match contra-side bids and offers pending in the order book 232. For example, the matching engine 234 may execute one or more matching algorithms that match contra-side bids and offers. A sell order is contra-side to a buy order. Similarly, a buy order is contra-side to a sell order. A matching algorithm may match contra-side bids and offers at the same price, for example. In certain embodiments, the additional exchanges 230a-230n may each include order books and matching engines (individually identified as the order book 232a-232n and the matching engine 234a-234n, which may be similar to the order book 232 and the matching engine 234, respectively). Different exchanges may use different data structures and algorithms for tracking data related to orders and matching orders.

In operation, the exchange 230 may provide price data from the order book 232 to the price server 222 and order data and/or fill data from the matching engine 234 to the order server 224 and/or the fill server 226. Servers 222, 224, 226 may process and communicate this data to the trading device 210. The trading device 210, for example, using a trading application, may process this data. For example, the data may be displayed to a user. In another example, the data may be utilized in a trading algorithm to determine whether a trade order should be submitted to the exchange 230. The trading device 210 may prepare and send an order message to the exchange 230.

In certain embodiments, the gateway 220 is part of the trading device 210. For example, the components of the gateway 220 may be part of the same computing platform as the trading device 210. As another example, the functionality of the gateway 220 may be performed by components of the trading device 210. In certain embodiments, the gateway 220 is not present. Such an arrangement may occur when the trading device 210 does not need to utilize the gateway 220 to communicate with the exchange 230, such as if the trading device 210 has been adapted to communicate directly with the exchange 230.

IV. Example Computing Device

Figure 3:
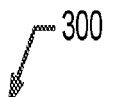
FIG. 3 illustrates a block diagram of an example computing device which may be used to implement the disclosed embodiments.
Figure 3:
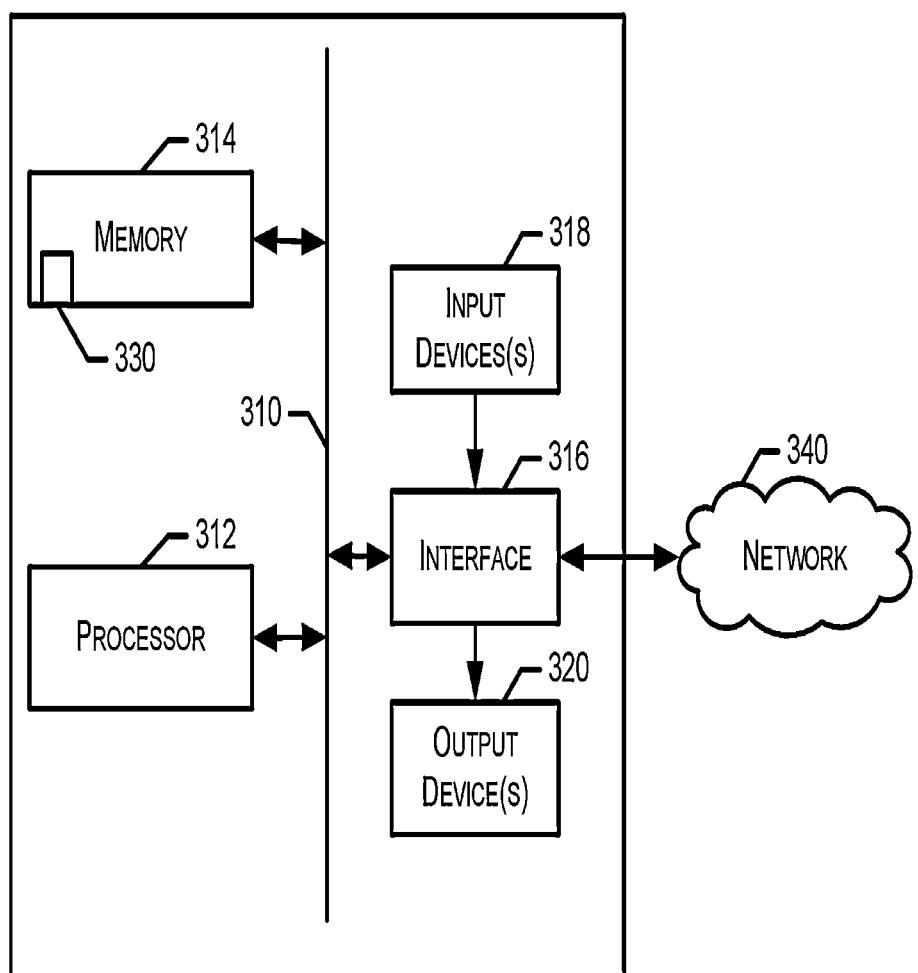

FIG. 3 illustrates a block diagram of an example computing device 300 which may be used to implement the disclosed embodiments. The trading device 110 of FIG. 1 may include one or more computing devices 300, for example. The gateway 120 of FIG. 1 may include one or more computing devices 300, for example. The exchange 130 of FIG. 1 may include one or more computing devices 300, for example.

The computing device 300 includes a communication network 310, a processor 312, a memory 314, an interface 316, an input device 318, and an output device 320. The computing device 300 may include additional, different, or fewer components. For example, multiple communication networks, multiple processors, multiple memory, multiple interfaces, multiple input devices, multiple output devices, or any combination thereof, may be provided. As another example, the computing device 300 may not include an input device 318 or output device 320.

As shown in FIG. 3, the computing device 300 may include a processor 312 coupled to a communication network 310. The communication network 310 may include a communication bus, channel, electrical or optical network, circuit, switch, fabric, or other mechanism for communicating data between components in the computing device 300. The communication network 310 may be communicatively coupled with and transfer data between any of the components of the computing device 300.

The processor 312 may be any suitable processor, processing unit, or microprocessor. The processor 312 may include one or more general processors, digital signal processors, application specific integrated circuits, field programmable gate arrays, analog circuits, digital circuits, programmed processors, and/or combinations thereof, for example. The processor 312 may be a single device or a combination of devices, such as one or more devices associated with a network or distributed processing. Any processing strategy may be used, such as multi-processing, multi-tasking, parallel processing, and/or remote processing. Processing may be local or remote and may be moved from one processor to another processor. In certain embodiments, the computing device 300 is a multi-processor system and, thus, may include one or more additional processors which are communicatively coupled to the communication network 310.

The processor 312 may be operable to execute logic and other computer readable instructions encoded in one or more tangible media, such as the memory 314. As used herein, logic encoded in one or more tangible media includes instructions which may be executable by the processor 312 or a different processor. The logic may be stored as part of software, hardware, integrated circuits, firmware, and/or micro-code, for example. The logic may be received from an external communication device via a communication network such as the network 340. The processor 312 may execute the logic to perform the functions, acts, or tasks illustrated in the figures or described herein.

The memory 314 may be one or more tangible media, such as computer readable storage media, for example. Computer readable storage media may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable medium and to exclude propagating signals. The memory 314 may include any desired type of mass storage device including hard disk drives, optical media, magnetic tape or disk, etc.

The memory 314 may include one or more memory devices. For example, the memory 314 may include local memory, a mass storage device, volatile memory, non-volatile memory, or a combination thereof. The memory 314 may be adjacent to, part of, programmed with, networked with, and/or remote from processor 312, so the data stored in the memory 314 may be retrieved and processed by the processor 312, for example. The memory 314 may store instructions which are executable by the processor 312. The instructions may be executed to perform one or more of the acts or functions described herein or shown in the figures.

The memory 314 may store a trading application 330. In certain embodiments, the trading application 330 may be accessed from or stored in different locations. The processor 312 may access the trading application 330 stored in the memory 314 and execute computer-readable instructions included in the trading application 330.

In certain embodiments, during an installation process, the trading application may be transferred from the input device 318 and/or the network 340 to the memory 314. When the computing device 300 is running or preparing to run the trading application 330, the processor 312 may retrieve the instructions from the memory 314 via the communication network 310.

V. Searching for Tradeable Objects

Figure 4A:
FIGS. 4A-4D illustrate an example user interface that may be displayed on a computing device to allow a user to search for tradeable objects across different electronic exchanges.
Figure 4A:
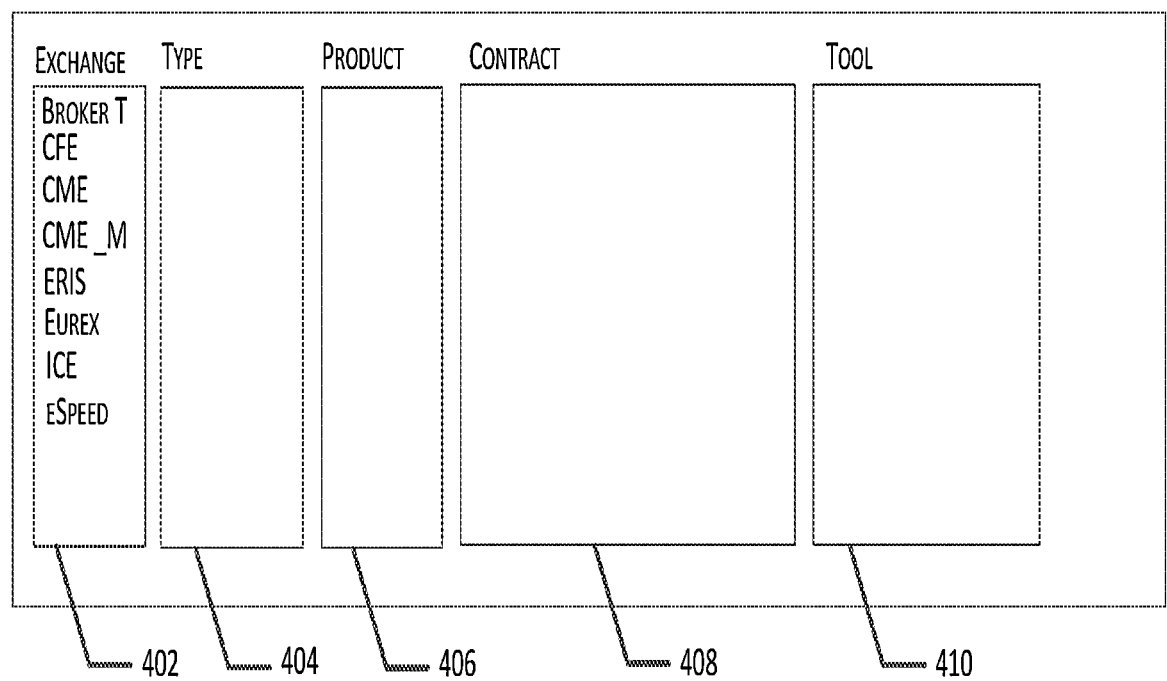

FIGS. 4A-4D illustrate an example user interface 400 that may be displayed on a computing device to allow a user to search for tradeable objects across different electronic exchanges. As the tradeable objects may be disbursed across many exchanges, the user interface 400 may assist the user in searching for the tradeable objects on different exchanges. As shown in FIG. 4A, the user interface 400 provides a number of fields 402, 404, 406, 408, 410 that each provide and display a list of different predefined choices that may be selected to allow a user to narrow a search for identifying tradeable objects. The tradeable objects may be stored in an organized dataset that allow a user to search for a tradeable object by navigating the dataset. The organized dataset may be a hierarchical dataset that identifies a relationship between different types of information in the dataset. For example, the hierarchical dataset may identify a relationship between exchanges, the financial product types capable of being traded at the exchanges, the financial products capable of being traded at the exchanges and the financial product type of the financial products, and the contracts or other instruments at the exchange for each financial product. The organized dataset may be a relational database, for example, that identifies a record for each contract, the financial product for each contract, the financial product type the financial product, and the exchange at which the contract may be traded.

A user may navigate the dataset by selecting different types of information in the fields 402, 404, 406, and/or 408 in the user interface 400. The selection of a tool in the tool field 410 may enable the user to display the tradeable object identified in the search and/or market data related to the tradeable object. The fields may include an exchange type field 402, a financial product type field 404, a financial product identifier field 406, a contract field 408, and/or a tool field 410. The financial product identifier field 406 and the contract field 408 may identify tradeable objects for being displayed in a tool. Each of the fields 404, 406, 408, and 410 may display different predefined choices based on a user selection in one or more prior fields beginning with the exchange type field 402. The exchange type field 402 may be used to identify a name of an electronic exchange and/or a gateway that may be used to obtain market data related to a tradeable object. The financial product type field 404 may be used to identify a type of financial product. The product type field 404 may include futures, spreads, options, and/or strategies, for example. The product identifier field 406 may be used to identify a name or a symbol of a financial product. The contract field 408 may be used to identify the list of contracts or instrument for an identified financial product.

Figure 4B:
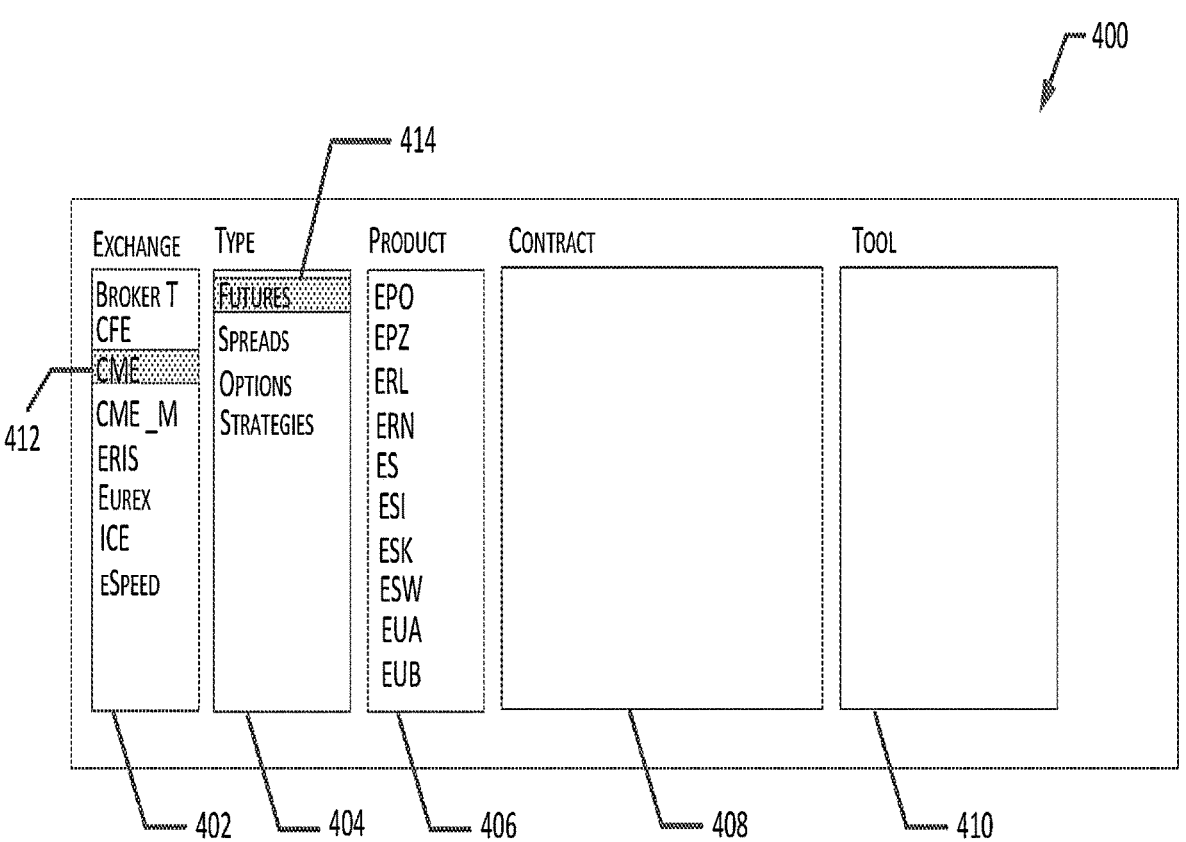

As shown in FIG. 4A, the exchange type field 402 may be pre-populated with a number of available exchanges and/or gateways on which a tradeable object, such as a financial product or contract, may be traded. A user may select an exchange in the exchange type field 402 to identify the exchange at which a tradeable object may be traded. As shown in FIG. 4B, the user may identify exchange 412 to narrow the search for the tradeable object to the identified exchange. The exchange 412 is the abbreviation "CME" for the Chicago Mercantile Exchange, though any other exchange and/or gateway may be selected from the exchange type field 402.

The selection of the exchange 412 in the exchange type field 402 may generate a display of defined choices in the financial product type field 404. The financial product type field 404 may display a list of predefined financial product types that may be available at the selected exchange 412. A user may select a financial product type 414 in the financial product type field 404 to narrow the search for the tradeable object to the identified financial product type. The financial product type 414 is selected in FIG. 4B for "Futures" products, though any other financial product type (e.g., spreads, options, or strategies) may be selected from the product type field 404. The selection of the financial product type 414 in the financial product type field 404 may generate a display of choices in the financial product identifier field 406. The financial product identifier field 406 may display a list of predefined financial product names, or abbreviations of financial products, that may be available at the selected exchange 412.

Figure 4C:
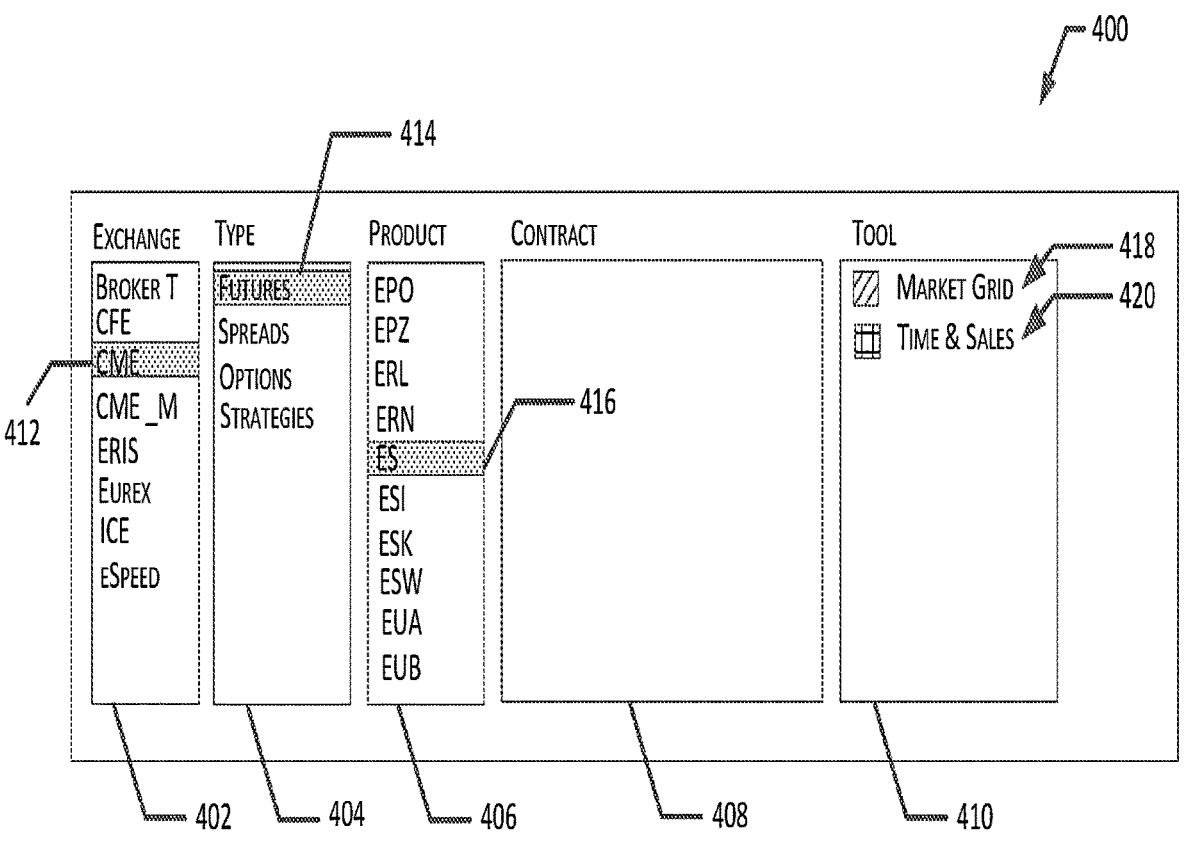

As shown in FIG. 4C, a user may select a financial product 416 in the financial product identifier field 406. The financial product 416 that is selected in FIG. 4C is for "ES" products, which is the ticker symbol for E-Mini S&P products. The "ES" products are futures contracts that may be traded on the Chicago Mercantile Exchange, so the "ES" products may be identified upon selection of the exchange 412 and the selection of the financial product type 414. Though "ES" products are the products selected in the financial product identifier field 406, any other financial products may be selected from the financial product identifier field 406. Additionally, though a single product is selected for the financial product identifier field 406, multiple products may be selected from the financial product identifier field 406 for being displayed in a tool.

The selection of the financial product 416 may generate the name of one or more tools in the tool field 410 that may be used to display market data for the selected financial product 416. The tools in the tool field 410 may be generated based on the financial products type 414 and/or the financial product 416 that are selected. For example, as shown in FIG. 4C, the tools displayed in the tool field 410 may be tools that may be used to display market data for futures contracts. Different tools may be generated in the tool field 410 based on the selected financial products type 414 and/or the financial product 416. The tools in the tool field 410 may retrieve market data from the selected exchange 412 for the selected product 416 upon execution. The type of market data retrieved and/or displayed in the tools in the tool field 410 may be specific to the financial product type 414 selected.

The tools in the tool field 410 may be applications (e.g., trading applications) embedded within the user interface 400, display windows embedded within the user interface 400, applications (e.g., trading applications) generated in a separate user interface or window, display windows generated outside of the user interface 400, and/or the like. For example, the tools may be a trading application such as ADL®, AUTOSPREADER®, and/or AUTOTRADER™ provided by Trading Technologies. In certain embodiments, the tools displayed in the tool field 410 may be stand-alone applications and/or links to stand-alone applications. A stand-alone application may be a full featured application such as AUTOTRADER™ and/or a specialized application such as a trading widget. A trading widget may be any application configured to provide specialized trading functionality such a charting window, a time and sales window, an order book, and a trading window, for example. Upon selection of one of the tools in the tool field 410, the computing device on which the user interface 400 is being displayed, or another remote computing device with which the computing device on which the user interface 400 is being displayed is interacting, may send a request to the identified exchange and/or gateway 412 in the exchange type field 402 for the market data for the defined financial product 416 having the defined financial product type 414. Each of the tools may send a request that includes different parameters for retrieving and/or displaying different market data. One or more of the tools may allow a user to perform actions on the retrieved market data, such as submitting trade orders to an exchange, for example.

The tools in the tool field 410 in FIG. 4C include the market grid tool 418 and the time and sales tool 420. The market grid tool 418 may display real-time market data for the selected financial product 416 in the financial product identifier field 406. The time and sales tool 420 may identify records of sales information the selected financial product 416 in the financial product identifier field 406. For example, the records in the time and sales tool may identify a time and a sale of the selected financial product 416 for a defined period of time.

Figure 4D:
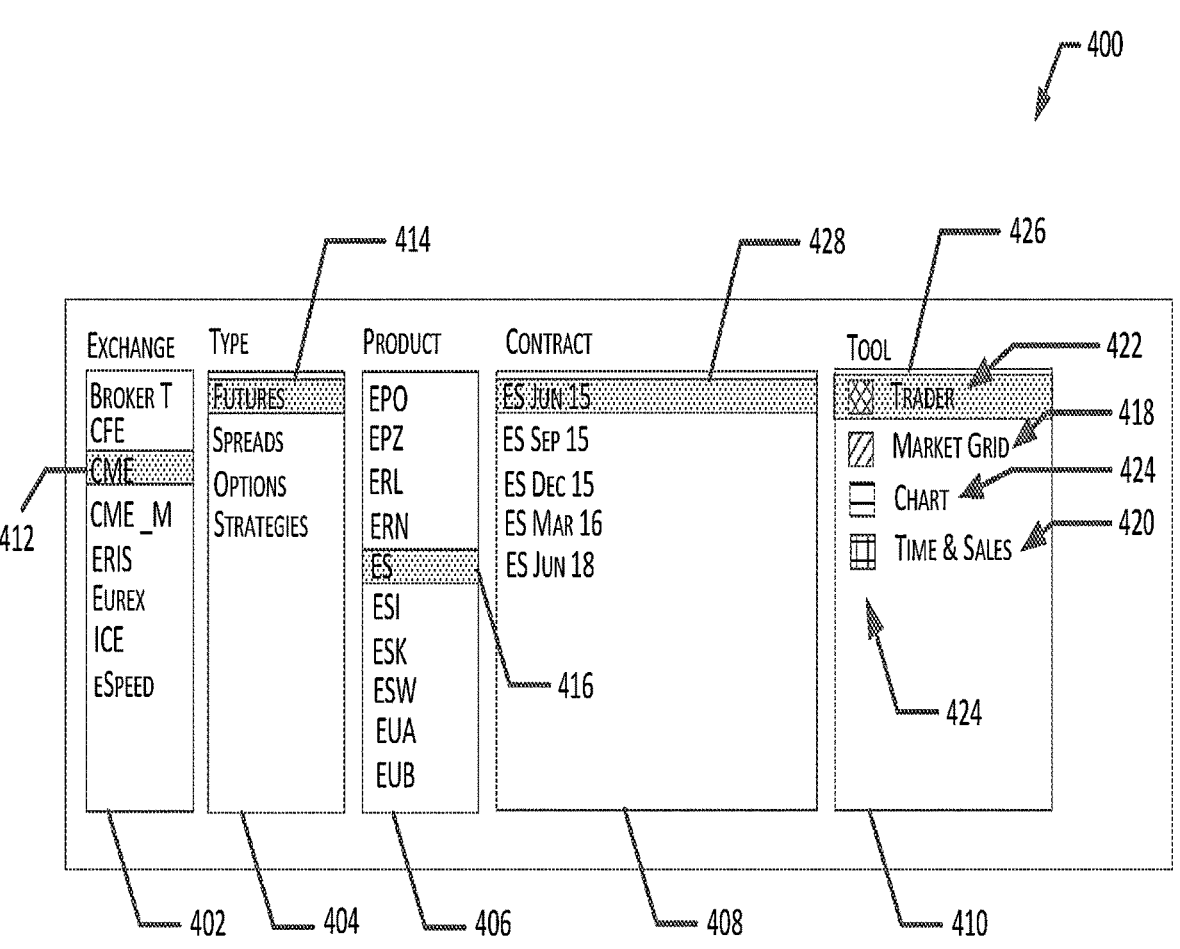

As shown in FIG. 4D, the selection of the financial product 416 in the product identifier field 406 may generate and display contracts in the contract field 408. The contract field 408 may display a list of predefined contracts that may be available at the selected exchange 412 for the selected financial product 416. The contract field 408 may allow a user to select the specific contracts or instruments for which market data may be displayed. For example, a user may select one or more contracts or instruments in the contracts field 408 for being displayed in a tool. The contract 428 is selected in FIG. 4D for the "ES June 15" contract, though any other contract or instrument may be selected from the contracts field 408. Additionally, though a single contract is selected from the contracts field 408, multiple contracts may be selected from the contracts field 408 for being displayed in a tool.

The selection of the contract 428 in the contracts field 408 may generate the name of one or more tools in the tool field 410 that may be used to display information for the selected contract 428. For example, the tools may display market data for the selected contract 428. The tools in the tool field 410 may include the tools generated upon the selection of a financial product 416 in the financial product type field 406 and/or other tools. For example, the tools in the tool field 410 may include the trader tool 422 and/or the chart tool 424. The trader tool 422 may display real-time market data for the selected contract 428 in the contract field 408 and may allow a user to submit trade orders to an exchange, such as the selected exchange 412. For example, the trader tool 422 may be a trading tool such as MD TRADER® provided by Trading Technologies. The chart tool 424 may display a graphical representation or chart identifying the market data for the selected contract 428 over a defined period of time. The chart tool 424 may identify trends in the market data for the identified tradeable objects over the defined period of time. Each of the tools in the tool field 410 may have different parameters of market data that may be retrieved and displayed to a user upon selection.

Upon receiving a selection in each of the fields 402, 404, 406, 408, the computing device on which the user interface 400 is being executed may request data for being displayed in one or more other fields. The user interface 400 may be executed locally on a computing device or on a remote computing device from the computing device on which the user interface 400 is being displayed. For example, the user interface 400 may be generated at a remote computing device and displayed on a user's computing device via an application (e.g., web browser, app, etc.). The request for data for populating the fields 402, 404, 406, 408, and/or 410 may be in the form of a query to an organized dataset having parameters that indicate one or more prior selections. The request may be made to local storage at the computing device or to a remote storage device. The data displayed in one or more of the fields 402, 404, 406, 408, 410 may be stored locally, while the data for other fields may be stored remotely. For example, the exchanges in the exchange field 402 and/or the tools in the tool field 410 may be stored locally at a computing device, as the number of exchanges and/or tools may be static and may be predefined lists that may occupy less memory. As the data displayed in the fields 404, 406, and/or 408 may depend on user selections in prior fields, the data for populating the fields 404, 406, and/or 408 may be stored remotely to reduce the amount of memory on a computing device, such as a user device, that may be occupied for each combination of user selections in the user interface 400.

Upon receiving a selection of a tool in the tool field 410, the computing device on which the user interface 400 is being executed may request market data from the selected exchange 412 for being displayed in the selected tool. The request for the market data may be in the form of a query including one or more parameters such as, the selected exchange 412, the selected financial product type 414, the selected financial product 416, and/or the selected contract 428. The query may include parameters that identify market data specific to the selected tool being displayed. For example, the query may include parameters such as, the current bid/ask quantities, the current high, low and last traded prices, the trading volume in the market, the trading status of an individual order and/or the market, and the settlement status.

As shown in FIGS. 4A-4D, searching for tradeable objects in an organized dataset may be performed by navigating through a number of fields. The search may be conducted by a search engine at a computing device. The search engine may receive user selections and display different information in the user interface 400 in response to the user selections, as described herein, to allow a user to navigate the organized dataset.

VI. Contextual Searching

Figure 5A:
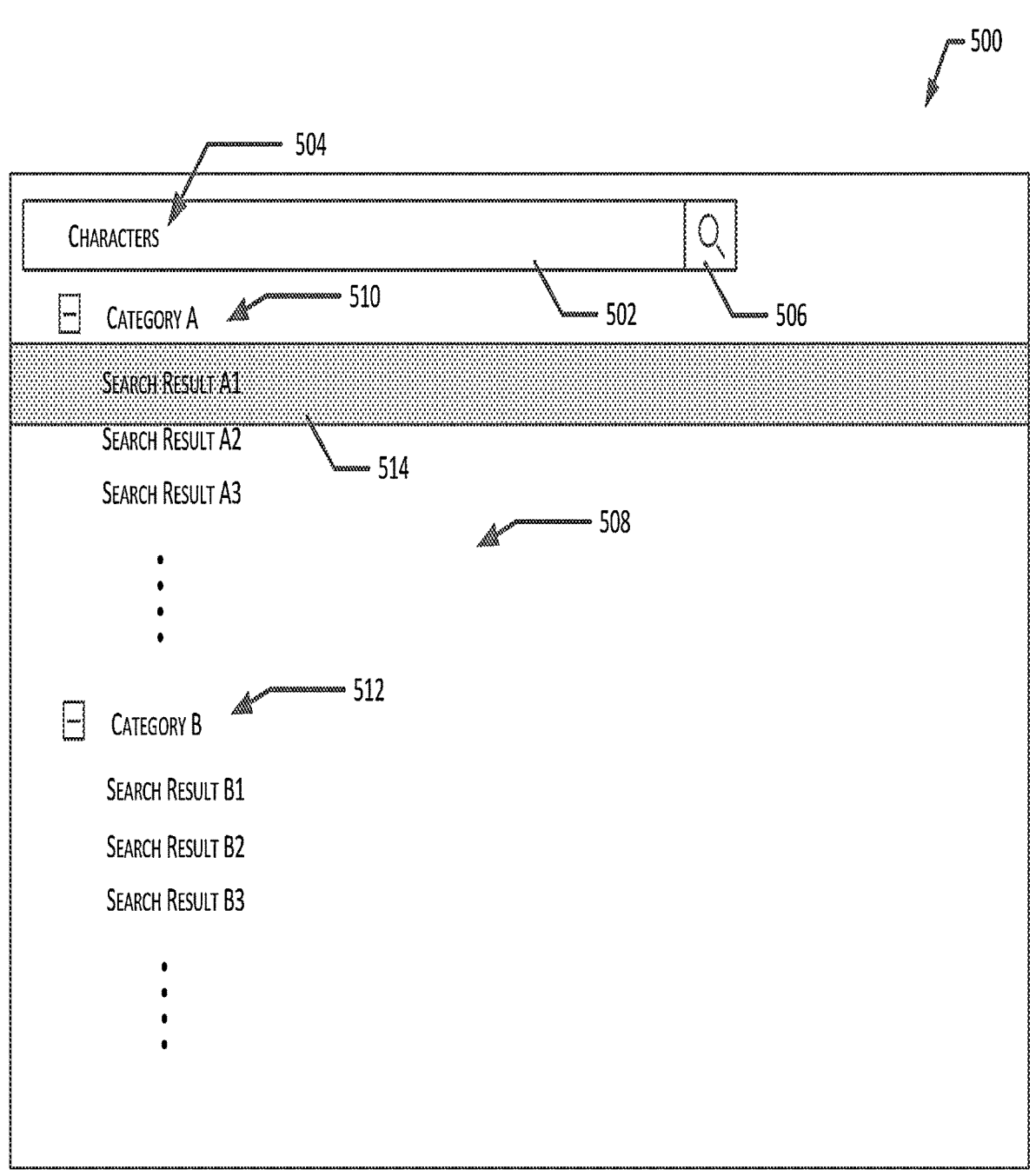
FIGS. 5A-5C illustrate an example user interface that may be displayed on a computing device to allow a user to perform a contextual search using context filters.
Figure 5B:
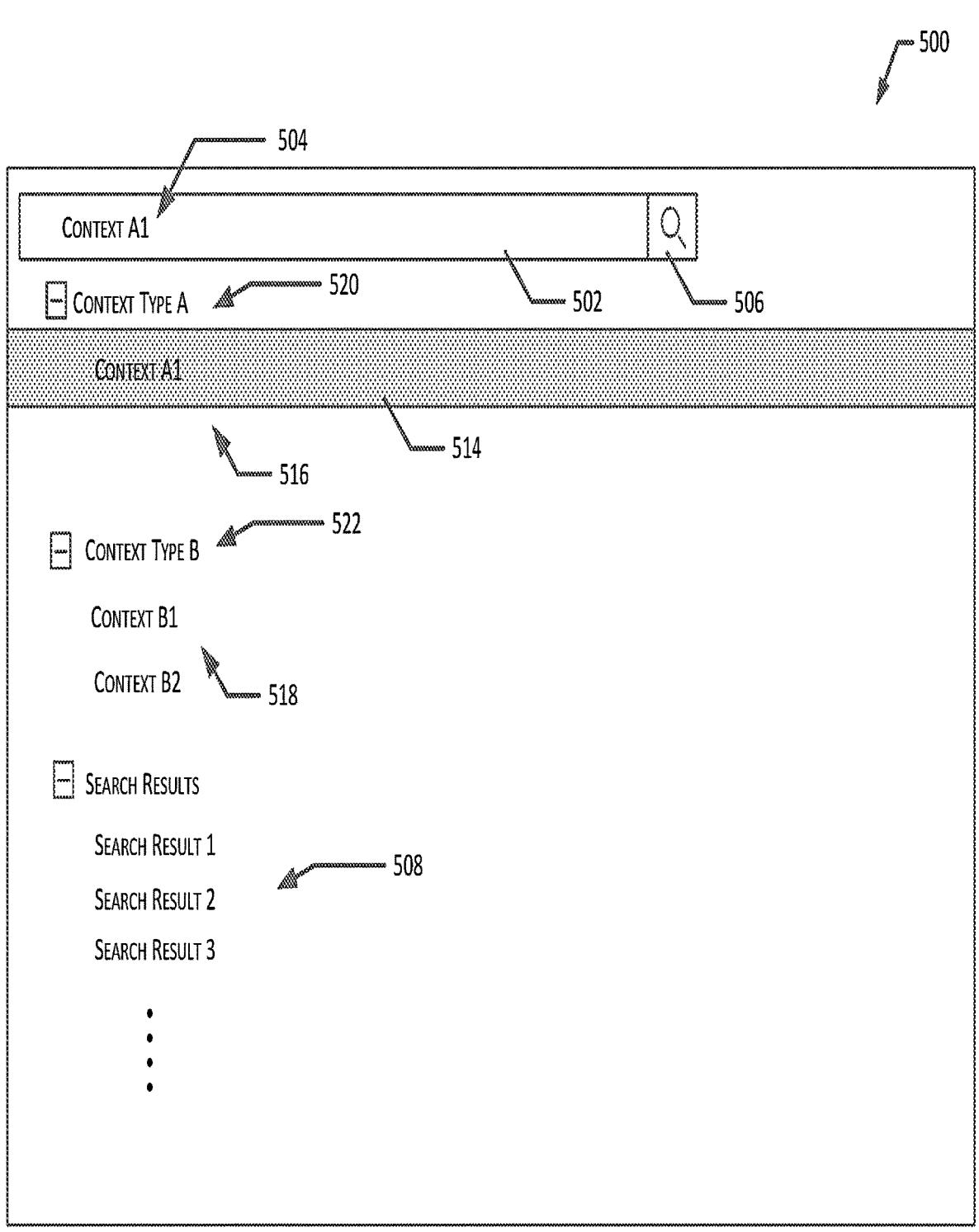
Figure 5C:
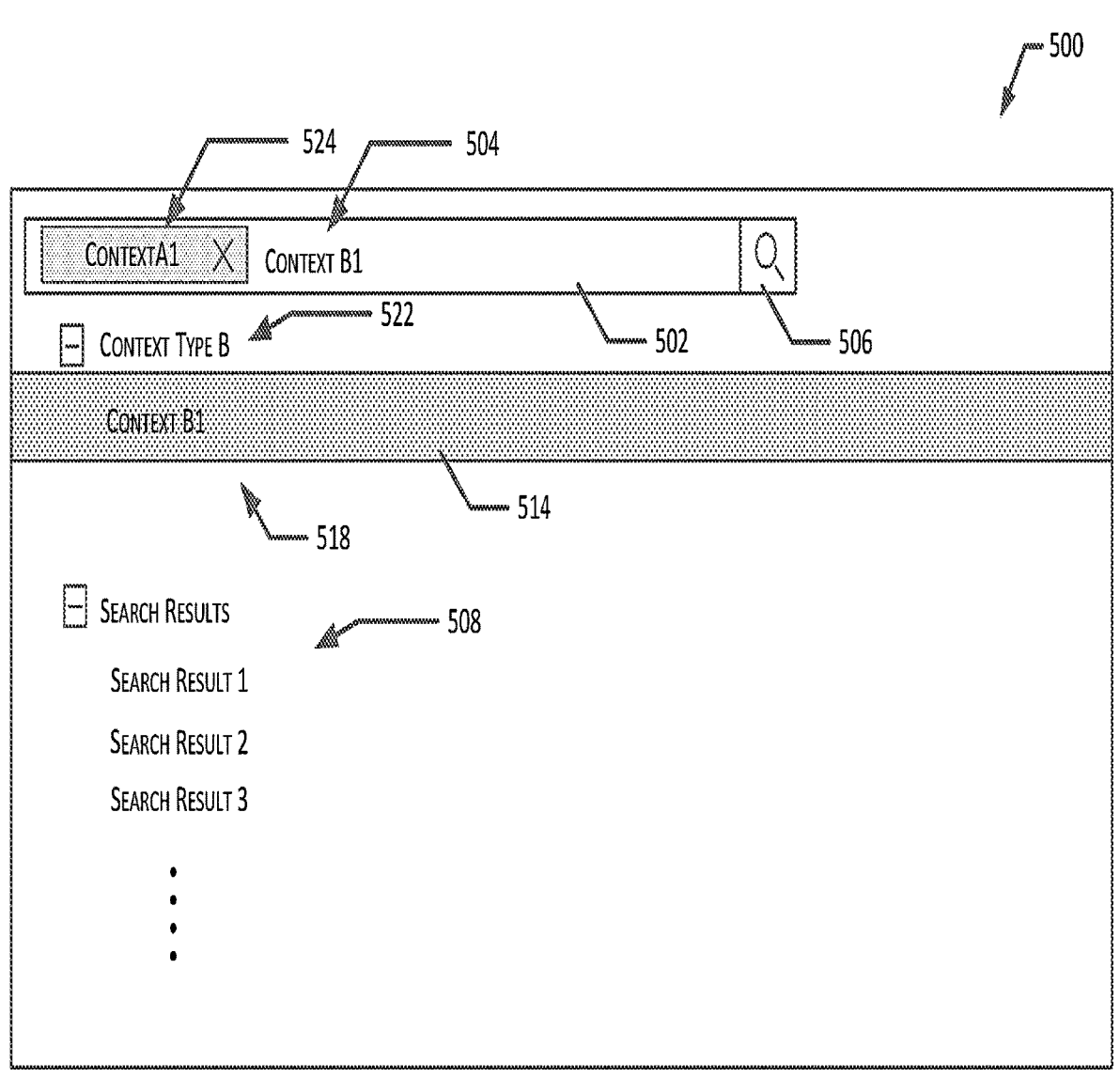

FIGS. 5A-5C illustrate an example user interface 500 that may be displayed on a computing device to allow a user to perform a contextual search using context filters. Contextual searching returns search results based on the context and/or search query provided by the user. The user provided context defines the search areas and/or topics of interest to the user. Search results are returned based on the overall context provided, and the returned search results are organized based on the order in which characters of the search string are received. The search results may further be organized based on the type, class or other hierarchy of the returned results. The contextual search may increase the accuracy of the search results based on the value of the results to the user.

As shown in FIGS. 5A-5C, the user interface 500 may include a search field 502 that may receive characters (e.g., numbers, letters, symbols, etc.) as a search input. A user may enter a character string 504 as the search input and execute the search on the character string 504 to retrieve a subset of search results 508 that match the character string 504. For example, the search may be executed in response to a user selection of a key (e.g., enter key) or combination of keys. The search may be executed in response to a user selection on the user interface 500, such as the selection of the search icon 506.

Upon execution of a search, the computing device on which the user interface 500 is displayed may submit a query to an organized dataset to return the search results 508 that match the query. The query may be made to local storage at the computing device or to a remote storage device. The computing device may match the character string 504 to the characters (e.g., all characters or a portion of the characters) in the name or description of the search results 508 and return the results for display in the user interface 500. The search results 508 may be stored in the organized dataset in different categories and may be displayed in different categories 510, 512 in the user interface. The categories 510, 512 may identify the type of data being displayed in the search results. For example, when the organized dataset includes tradeable objects, such as financial products or contract, the categories may identify the type of tradeable objects being displayed and/or an exchange at which the tradeable object may be traded. The user may navigate through the different categories 510, 512 of search results and identify a search result 514. The search result 514 may be identified in the user interface 500 by default or may be identified by user selection.

To assist a user in finding desired search results more quickly, the computing device that is performing the search may identify contexts that may be defined by a user and use the contexts to further limit the potential search results in the organized dataset. For example, when used for a trading application, the user interface 500 may submit information to a computing device to search for a tradeable object. The user may be unaware of the name or the symbol of the tradeable object to be able to identify the tradeable object in a direct match, but may be able to provide context for the tradeable object, such as the exchange at which the object is traded, for example.

As shown in FIG. 5B, the character string 504 may identify contexts that may be used to limit search results that may be returned from the organized dataset. The computing device displaying the user interface 500 may receive the characters of the character string 504 and may identify different contexts 516, 518 based on the character string 504. The contexts may be retrieved based on a query to the organized dataset for the contexts and/or context types that match the character string 504. The contexts may be stored in the organized dataset with the search results to which they may provide context. For example, the contexts may be stored in each record in a database to which they may apply. The contexts 516, 518 may be displayed at the user interface 500 with a respective context type 520, 522. Though two context types 520, 522 are shown in the interface 500, any number of context types may be identified and/or displayed.

As shown in FIG. 5B, the user may enter a character string 504 that identifies a context, such as the context 516. The user interface 500 may limit the contexts being displayed for the context type 520 to the context 516 that matches the character string 504. The contexts 518 may be displayed for context type 522, as the contexts 518 may have a relationship to context 516. For example, contexts 518 may be a subset of the context 516. The search results 508 may be updated based on the identified context 514 in the character string 504. The contexts 516, 518, context types 520, 522, and/or the search results 508 may be dynamically identified and/or updated in real-time as the user is entering characters in the search field. Certain contexts may be stored locally to be quickly updated dynamically. Certain contexts may be stored remotely, as they may be updated more frequently or may occupy more memory.

As shown in FIG. 5C, a context filter 524 may be defined upon receipt of a triggering event for defining the context filter 524. For example, the triggering event may be the identification of a delimiter received as part of the character string 504 or selection of a context displayed in the user interface 500. The delimiter in the character string 504 may be a space character or a tab character received as part of the character string 504, for example. The computing device on which the user interface 500 is executed may identify the delimiter and define or establish the context filter 524 based on the remaining characters provided as part of the character string 504. The context filter 524 may be identified as an icon in the user interface that the user may unselect as a filter (e.g., by selecting the "x" in the icon for the context filter). After the identification of the delimiter and definition of the context filter 524, a user may continue to enter characters in the search field 502 to identify additional contexts and further limit the search results 508. The user may continue to enter characters in the search field 502 that identify the search result or subset of search results within the defined context filter 524. The search results will continue to be limited or reorganized in priority according to the number of contexts that are matched in the queries.

The search results may each be associated in the organized datasets with different contexts. A query may be submitted by the computing device displaying the user interface 500 to the organized dataset to retrieve the subset of search results 508 that are related to the identified contexts in the search field 502. The query may be submitted to an organized dataset that is stored locally at the computing device or remotely on another computing device. The query may include the defined context or contexts, and/or the context types, as parameters. The computing device may compare the string of characters received as the search input to entries in the organized dataset to retrieve a subset of search results 508 that match the string of characters in the search field 504. The computing device may also compare the string of characters received as the search input to different contexts to which the search results are related to retrieve the contexts that match the context identified in the string of characters.

VII. Contextual Searching for Tradeable Objects

FIGS. 6A-6E illustrate an example user interface that may be displayed on a computing device to allow a user to perform a contextual search for tradeable objects across different electronic exchanges. The contextual search for tradeable objects may increase the accuracy of the tradeable objects returned to a user based on the number of defined contexts that are matched for each tradeable object. As shown in FIGS. 6A-6E, the user interface 600 may include a search field 602 that may receive characters (e.g., numbers, letters, symbols, etc.) as a search input. A user may enter a character string 604 as the search input and execute the search on the character string 604 to retrieve a subset of search results 608 from an organized dataset. The user may execute the search on the character string 604 to retrieve a subset of contexts and/or search results that match the character string 604 in the organized dataset. For example, the search may be executed in response to a user selection of a key (e.g., enter key) or combination of keys. The search may be executed in response to a user selection on the user interface 600, such as the selection of the search icon 606.

The character string 604 may include one or more identifiable contexts related to a tradeable object to limit the search results that may be returned from the organized dataset. The contexts may be of different context types. For example, the context types may include exchanges and/or financial product types for financial products that may be retrieved from the organized dataset. The contexts may include exchanges, financial product types, and/or financial products for contracts or other instruments that may be retrieved from the organized dataset. The financial products may be contexts and/or search results. The contracts or other instruments may be search results.

Figure 6A:
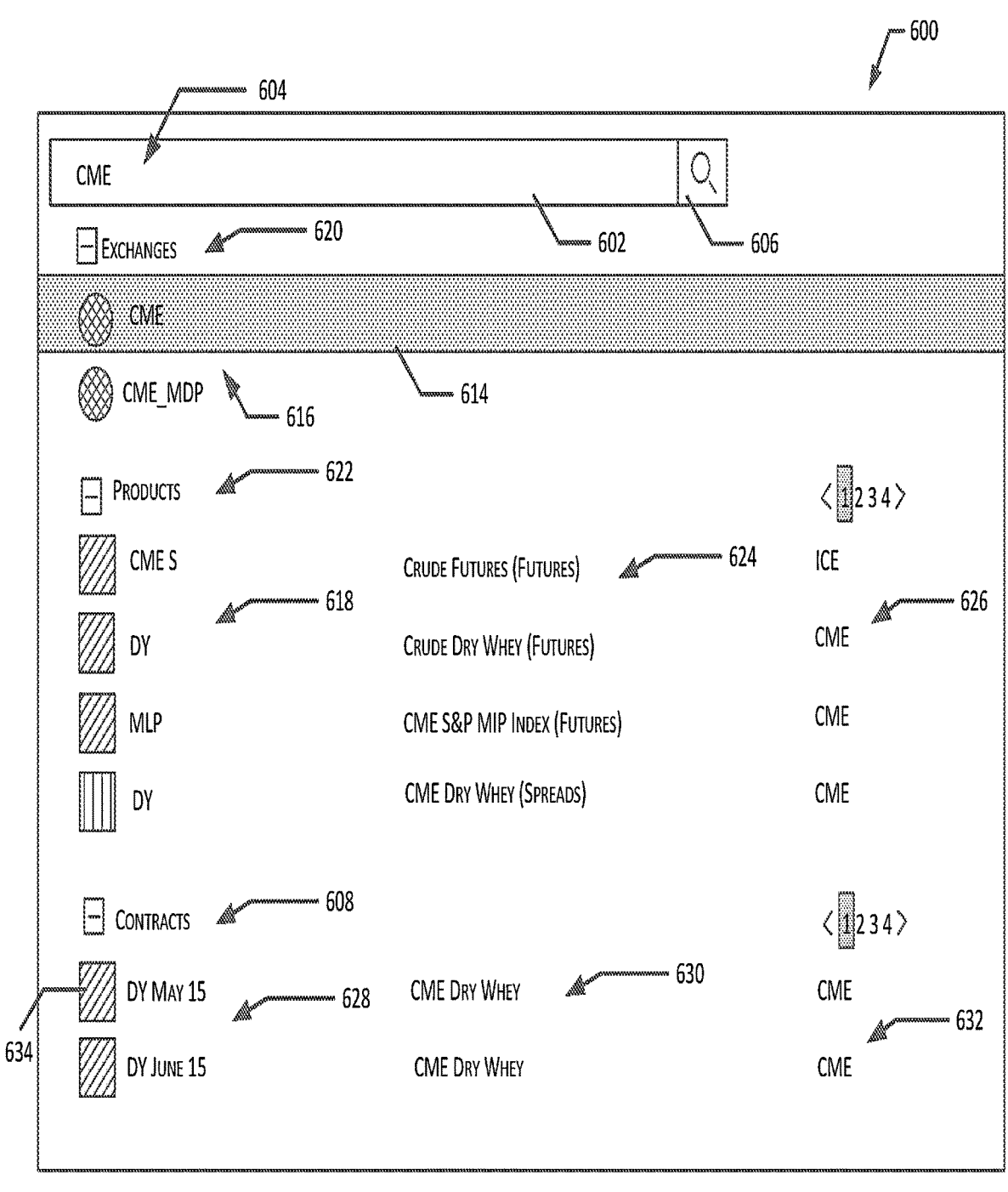
FIGS. 6A-6E illustrate an example user interface that may be displayed on a computing device to allow a user to perform a contextual search for tradeable objects across different electronic exchanges.

As shown in FIG. 6A, the character string 604 may include the characters "CME". The characters in the character string 604 may identify one or more exchanges 620 at which a tradeable object may be traded. The computing device generating the user interface 600 may identify characters in the character string 604 and may display the contexts and/or search results that may match the characters in the character string 604. The contexts and/or search results may be identified dynamically as the user is typing the characters in the character string 604. Each context type may be a subset of the other context types. The user interface 600 may list the contexts starting with the broadest context type (e.g., exchanges) that matches the character string 604 and list the other context types and/or the search results that match the identified context types.

The computing device generating the display 600 may identify the exchanges 620 that include the character string 604 (e.g., "CME") and display the identified exchanges 620 in a list. The exchanges 620 may be identified by the exchange identifier 616. The exchange identifier 616 for each exchange 620 may be the name of the exchange or an abbreviation for the exchange. The exchange identifiers 616 may also, or alternatively, be the name of a gateway or an abbreviation for the gateway. The exchanges 620 may be stored with the exchange identifier 616 in the organized dataset. The computing device generating the display 600 may identify the characters in the character string 604 and may submit a query to the organized dataset for the exchanges 620 that include the character string 604 in the exchange identifier 616.

The computing device generating the display 600 may identify the financial products 622 that include the character string 604 (e.g., "CME") and display the identified financial products 622 in a list. The financial products 622 may include the character string 604 in a financial product identifier 618, a financial product description 624, and/or a financial product exchange identifier 626. The financial product identifier 618 may identify the name and/or abbreviation of the financial products. The financial product description 624 may include the name and/or financial product type (e.g., futures, spreads, options, strategies, etc.) for the financial product. The financial products 622 may be stored in the organized dataset with the financial product identifier 618, the product description 624, and/or the financial product exchange identifier 626.

The financial products 622 in the organized dataset that include the character string 604 in the financial product identifier 618, the product description 624, and/or the financial product exchange identifier 626 may be identified and displayed in the list of financial products 622. The computing device generating the display 600 may identify the characters in the character string 604 and may submit a query for the financial products 622 that include the character string 604 in the financial product identifier 618, the financial product description 624, and/or the financial product exchange identifier 626. The query may be the same query as the query on the exchanges 620 and may include additional parameters for the financial products 622; or the query may be a separate query from the query on the exchanges 620.

The financial products 622 may be search results that are displayed in the user interface 600 as tradeable objects or a context type that may be used to provide contexts for the contracts 608. The contracts 608 may be displayed as search results obtained from the organized dataset. The computing device generating the display 600 may identify the contracts 608 that include the character string 604 (e.g., "CME") and display the identified contracts 608 in a list. The contracts 608 may include the character string 604 in a contract identifier 628, a contract description 630, and/or a contract exchange identifier 632. The contract identifier 628 may identify a product identifier for the contract (e.g., a name or abbreviation), a month for the contract, and/or a year for the contract. The contract description 630 may identify the financial product name, financial product identifier, and/or exchange identifier for the contract.

The contracts 608 may be stored with the contract identifier 628, the contract description 630, and/or the contract exchange identifier 632. The contracts in the organized dataset that include the character string 604 in the contract identifier 628, the contract description 630, and/or the contract exchange identifier 632 may be identified and displayed in the list of contracts 608. The computing device generating the display 600 may identify the characters in the character string 604 and may submit a query to the organized dataset for the contracts 608 that include the character string 604 in the contract identifier 628, the contract description 630, and/or the contract exchange identifier 632. The query may be the same query as the query on the exchanges 620 and/or the financial products 622 and may include additional parameters for the contracts 608; or the query may be a separate query.

The user interface 600 may identify the financial product types (e.g., futures, spreads, options, strategies, etc.) for the contexts and/or the search results. The financial product types may be identified and used as additional contexts for determining search results. The computing device generating the display 600 may submit a parameter in the query for the contexts and/or search results that are being displayed to retrieve the financial product type associated with the contexts and/or the search results. The financial product types may be identified by a respective icon 634 that indicates the financial product type (e.g., futures, spreads, options, strategies, etc.) for the contexts and/or the search results. The financial product types may also be identified by respective colors, identifying text, or other distinguishing identifier in the user interface 600.

Figure 6B:
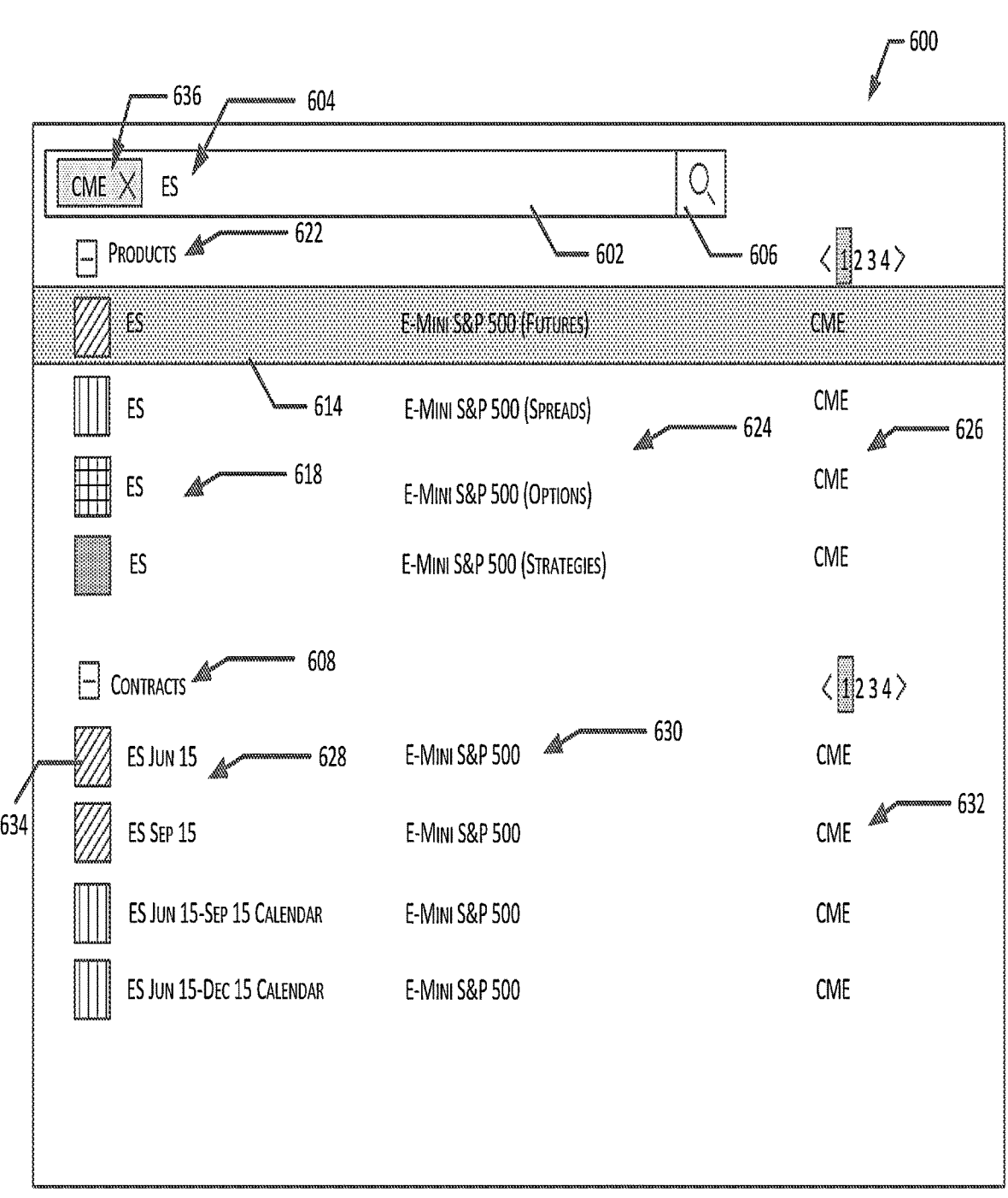

A user may submit a triggering event for defining a context filter based on the character string 604. For example, the triggering event may be a user selection of an identified context at 614 in the user interface or a delimiter (e.g., space, tab, etc.) in the character string 604. As shown in FIG. 6B, the user interface 600 may generate a context filter 636 upon receiving the selection or identifying the delimiter in the character string 604. The use of the delimiter in the character string 604 may allow a user to continue typing and define context filters quickly while typing characters into the search field 602. The context filter 636 may be indicated by an icon that represents the context filter being applied to the contexts and/or search results being displayed in the user interface 600. The context filter 636 may be removed by a user selection in the user interface 600 (e.g., by selecting the "x" in the icon for the context filter 636). The contexts, context types, and/or search results in the user interface 600 may be updated according to the defined context filter 636.

The context filter 636 shown in FIG. 6B is for the "CME" exchange, though other context filters 636 may be defined. The user interface 600 may provide the financial products 622 and/or the contracts 608 that are stored with the "CME" exchange being identified in the organized dataset. As an exchange has been defined in the context filter 636, the other exchange types may be removed from the user interface 600 to limit the search context to the defined exchange. The computing device generating the display 600 may query for the financial products 622 and/or the contracts 608 that relate to the "CME" exchange, which may be identified in the financial product exchange identifier 626 and the contract exchange identifier 632, respectively. The user interface 600 may limit, or rearrange the priority of, the financial products 622 and/or the contracts 608 according to the defined context filter 636 to identify the more relevant results based on the context of the defined context filter 636.

The user may continue to enter characters into the character string 604 to provide additional context to the search and return more relevant search results. In FIG. 6B, the additional characters in the character string 604 are "ES," which identifies financial products in the "CME" exchange. As shown in FIG. 6B, the financial product "ES" may be of multiple types (e.g., futures, spreads, options, strategies) in the "CME" exchange. The user may select the financial product from the user interface 600 to define the context filter having a certain financial product name or abbreviation. The user may also enter the delimiter to define the selected context filter identified at 614. When the delimiter is selected and there are multiple options that may be matched by the character string 604, the computing device may select a default option. For example, the "ES" futures product may be selected as the default option. The default option may be based on being a more popular user selection, may be user defined, may be the option that most closely matches to the character string 604 (e.g., exact match), or may be otherwise predefined by the system. Each of the context types may be organized for different character strings to identify default context filters that may be identified and/or selected upon identification of a delimiter in the character string 604.

The context filter selected at 614 may identify the default context filter for the financial products 622 that match the character string 604. The organized dataset may include the name and/or abbreviation for financial products. Where the organized dataset includes one of the name or abbreviation for the financial products, the computing device may perform a lookup (e.g., locally or via a remote computing device) to return the product name or a product abbreviation when one or the other is entered into the character string 604. For example, the computing device may query a product dataset that identifies a list of financial products and the corresponding abbreviation for the financial products. This may allow a user to enter either the name or the abbreviation for a product into the search field 602 to add the financial product context or otherwise retrieve a list of financial products by name or abbreviation.

Figure 6C:
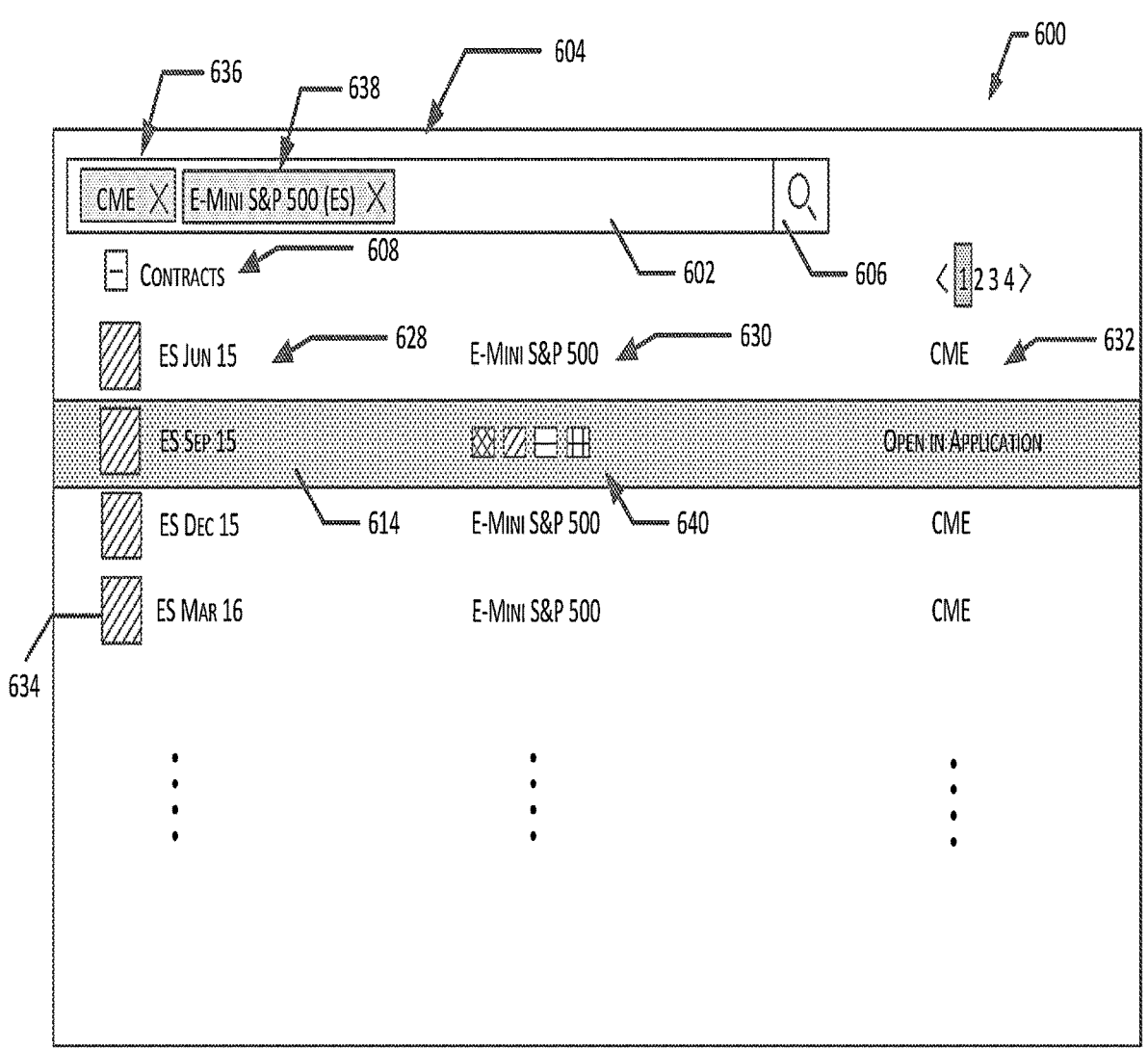

As shown in FIG. 6C, the user interface 600 may include multiple context filters 636, 638. The context filter 638 may be defined upon the identification of a delimiter or user selection at the computing device generating the user interface 600. The user interface 600 may provide the contracts 608 that relate to the defined context filters 636,638 in the search field 602. The context filter 638 may be indicated by another icon that represents the context filter being applied to the contexts and/or search results being displayed in the user interface 600.

The context filter 638 shown in FIG. 6C is for the "ES" financial services product. The user interface 600 may provide the contracts 608 that relate to the "ES" financial product in the "CME" exchange. The computing device generating the display 600 may identify the delimiter or user selection and query for the contracts 608 that relate to the "ES" financial product in the "CME" exchange. The financial product context may be identified in the contract identifier 628 and/or the contract description 630 of each of the contracts 608, which may be stored in the organized dataset upon which the query may be performed. The exchange context may be identified in the contract exchange identifier 632 of each of the contracts 608, which may be stored in the organized dataset upon which the query may be performed. The user interface 600 may limit, or rearrange the priority of, the contracts 608 according to the defined context filters 636, 638 to provide the contracts 608 that are more relevant based on the context filters 636, 638.

The user may continue to enter characters into the search field 602 to provide additional context to the search and return more relevant search results. For example, the user may define a context filter for a financial product type and/or a tool that may be used to display the tradeable objects to be displayed in the search results. The user interface 600 may continue to update the search results based on the added context filters.

The user interface 600 may display contexts and/or tradeable objects (e.g., financial products and/or contracts) based on other factors that may indicate relevance. For example, the user interface 600 may display the tradeable objects that are traded more frequently above the tradeable objects that are traded less frequently, as the trading frequency may be a relevant factor to the user. The financial products or contracts that match the contexts in the search field 602 and are traded with greater frequency may be displayed higher in the search results. The user interface 600 may similarly display the contexts that are applied to a search more frequently above the contexts that are applied less frequently, as the context application frequency may be a relevant factor to the user.

The user may be limited to defining a single context filter for each context type into the search field 602. For example, if the user enters a context filter 636 for the "CME" exchange context, an inference may be made that the user is looking for results in the defined exchange and the user may be prevented from defining contexts for another exchange. The user interface 600 may remove the other contexts having a context type that is the same as the defined context filter to allow the user to further limit the results of the search. In another example, the user may be allowed to enter multiple context filters of the same context type by conjoining the context filters with an identified character or character string. For example, the user may conjoin context filters having the same context type by entering an "or" in between delimiters in the search field 602.

Each of the context filters 636, 638 may be independently applied to the contexts and/or search results displayed in the user interface 600. For example, the context filters 636, 638 may be defined in any order. Though the "ES" financial products defined in the context filter 638 may be a subset of the "CME" exchange defined in the context filter, the computing device may identify the context filters 636, 638 in any order and limit, or rearrange, the returned results based on the context filters in the aggregate. The context filters 636, 638 may also be removed from being applied to the search independently. For example, the first context filter 636 entered in the search field 602 may be removed and the context filter 638 may remain applied to the results.

The user interface 600 may display a number of tools in a tool field 640. The tools may be used to display identified tradeable objects and/or market data related to the tradeable objects. For example, the user may identify a contract at 614 and select a tool icon corresponding to one of the tools in the tool field 640 to execute the selected tool. The computing device may send a request to the exchange that relates to the selected tradeable object and display the market data in the executed tool. The context filters 636, 638 may provide the contexts for the type of market data to retrieve for being displayed in the executed tool. The parameters that identify the market data to be retrieved from the exchange may be defined based on the tool and/or the selected tradeable object. Different tools may be used to display different market data for selected tradeable objects. The parameters that identify the market data to be retrieved from the exchange may also be defined based on the context filters 636, 638. The context filters 636, 638 may provide the contexts for the type of market data to be retrieved for being displayed in the tools in the tool field 640.

The tools in the tool field 640 that are displayed in the interface 600 may be based on the selected tradeable object.

For example, different financial products and/or contracts may cause different tools to be displayed in the tools field 640. The tools in the tool field 640 may be trading widgets (e.g., specialized trading applications), applications (e.g., trading applications) embedded within the user interface 600, display windows embedded within the user interface 600, applications (e.g., trading applications) generated in a separate user interface or window, display windows generated outside of the user interface 600, and/or the like. The context filters 636, 638 may remain defined and the search results in the user interface 600 may stay persistent after selection of a tool by a user to allow a user to select another tool based on the search results displayed from the defined context filters 636, 638. This may allow a user to compare the market data for different tradeable objects (e.g., financial products, contracts, etc.) using the tools.

The tools in the tool field 640 may include the market grid tool, the time and sales tool, the trader tool and/or the chart tool (e.g., described above with reference to FIGS. 4A-4D). One or more of the tools may allow a user to perform actions on the retrieved market data. For example, the trader tool may allow a user to submit a trade order to an exchange, such as the exchange identified in the financial product exchange identifier 626 or the contract exchange identifier 632 for an identified tradeable object. The tools in the tools field 640 may be differentiated by different names, colors, icons, or other differentiators. The tools field 640 may be overlaid on top of a description of the tradeable object, such as the product description 624 and/or the contract description 630, for example. The tools field 640 may be displayed for a product 622 upon selection of the product 622 and/or the hovering of a mouse over the corresponding product description 624. The tools field 640 may be displayed for a contract 608 upon selection of the contract 608 and/or the hovering of a mouse over the corresponding contract description 630.

Figure 6D:
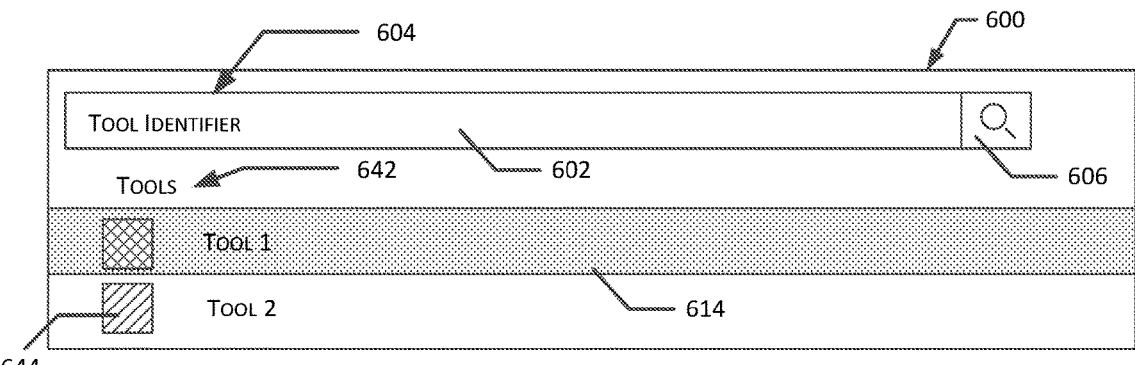

As shown in FIG. 6D, the user may enter a tool identifier into the search field 602 to search for a tool. The tool identifier may be a name or other identifier of a tool, for example. The computing device may receive the character string 604 and retrieve the tools 642 that include the character string 604 in the tool identifier. For example, the computing device may query a tools dataset to retrieve the tools 642 that have a tool name that includes the characters in the character string 604. The tools dataset may be stored locally at the computing device or at a remote computing device. The tools dataset may be a part of the organized dataset. The tool identifiers may be used as contexts to define a context filter upon receiving a triggering event from a user. The tool identifiers may be associated with the tradeable objects in the organized dataset that may be displayed in the tools and/or for which market data may be displayed in the tools. Each of the tools 642 may be separately identified by a tool icon 644, a tool identifier, colors, and/or other differentiators.

A user may execute a tool identified in the search field 602. For example, the user may enter the tool identifier into the search field 602 and may execute the identified tool in response to a user selection of a key (e.g., enter key) or combination of keys. The identified tool may be executed in response to a user selection on the user interface 600, such as the selection of the search icon 606 or the user selection at 614. The tools 642 may be populated dynamically as the user enters the characters in the character string 604. The identified tool may be entered in the text box 602 with (e.g., before or after) a tradeable object. The tool may be entered into the text box as a context or to execute the tool displaying the tradeable object and/or the market data related to the tradeable object upon execution of the tool. The computing device may identify the tool and the tradeable object upon receiving the command to execute the tool (e.g., a user selection of a key, a user selection of a combination of keys, or a user selection on the user interface) and may execute the tool displaying the tradeable object and/or the market data for the tradeable object.

Figure 6E:
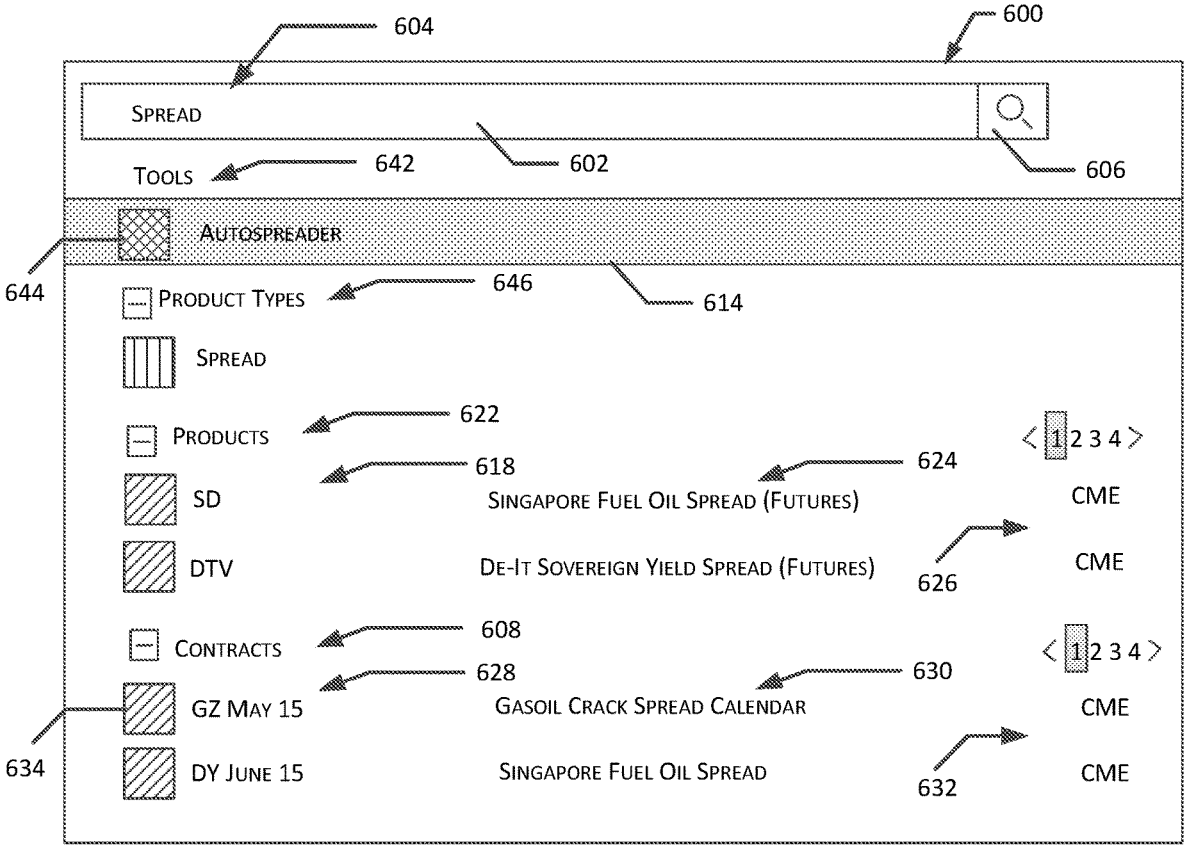

As shown in FIG. 6E, the user may enter a character string 604 into the search field 602 that may identify more than one context or a context, a tool, and/or a tradeable object (e.g., where the tool is not a context). For example, the character string may identify "Spread," which may identify the name of a tool 642 and/or the name of a financial product type 646. The financial product type 646 may identify a context for one or more tradeable objects, such as the financial products 622 and the contracts 608. The computing device may receive the character string 604 and may retrieve each of the contexts and/or tradeable objects that may be identified by the character string 604 by submitting a query to the tools dataset and/or the organized dataset. The contexts may be displayed in a list in the user interface 600 in a predefined order.

Figure 7:
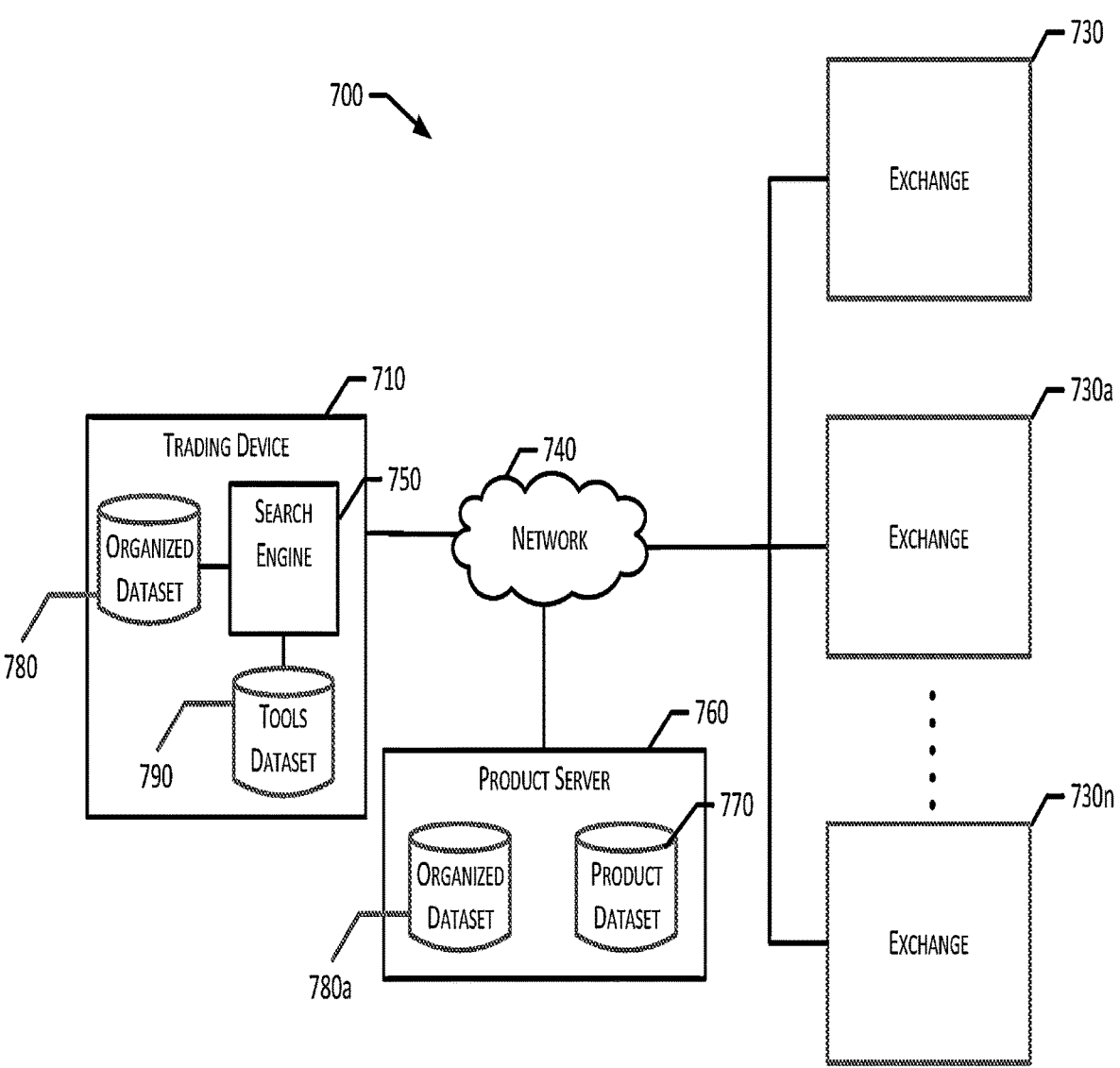
FIG. 7 illustrates a block diagram representative of an example system in which certain embodiments may be employed.

FIG. 7 illustrates a block diagram of an example system 700 that may be used to perform a search for one or more tradeable objects tradeable at an electronic exchange. The system 700 may include a trading device 710 that may receive market data from one or more exchanges, such as exchange 730 and/or exchanges 730a to 730n. The market data may correspond to one or more tradeable objects at each market. The trading device 710 may communicate with the exchanges directly or through a network 740.

The trading device 710 may be capable of displaying a user interface that may allow a user to perform a search as described herein. The trading device 710 may be a trading server and/or a trading terminal. The functionality described herein may be performed on the trading terminal, the trading server, or distributed across the trading terminal and the trading server. For example, the trading device 710 may include a trading terminal capable of displaying a user interface for an application executing locally on the trading terminal or an application executing remotely on the trading server (e.g., via a web browser or other application).

The trading device 710 may include a search engine 750, which may be executed locally at the trading terminal, at the trading server, or distributed across the trading terminal and the trading server. The search engine 750 may receive a search input from the trading device 710 and may retrieve information in response to the search input by submitting queries to one or more datasets stored in memory at one or more devices. For example, the search input may be a character string and the search engine 750 may use the character string to execute the search to retrieve a subset of search results that match the character string at one or more datasets. The search results may include contexts that may assist a user in identifying tradeable objects. The search results may include the tradeable objects themselves. The trading device may display the search results in a user interface to a user.

The search engine 750 may submit queries to an organized dataset 780 retrieve the search results. The organized dataset 780 may reside on memory at the trading device 710. The organized dataset 780 may reside at the trading terminal, the trading server, or may be distributed across the trading terminal and the trading server. The organized dataset 780 may be distributed across devices communicating on the network 740. For example, the organized dataset 780 may reside at the trading device 710 and the organized dataset 780a may reside on memory at a remote server, such as the product server 760. The product server 760 may be in communication with the trading device 710 over the network 740. Some search results may be stored in the organized dataset 780 at the trading device 710, while others may be stored remotely at the organized dataset 780a. For example, the organized dataset 780 may include exchanges and/or tools, while the organized dataset 780a may include financial product types, financial products, and/or contracts or other instruments.

The tools may also or alternatively be stored in a tools dataset 790 for being queried by the search engine 750. The tools dataset may identify the tools that may be executed for displaying data for one or more tradeable objects (e.g., financial products or contracts). The tools dataset 790 may identify the market data parameters to be retrieved from the exchanges 730 to 730n for being displayed in each tool. The tools dataset 790 may be stored in memory locally at the computing device or at a remote computing device, such as the product server 760. The tools dataset 790 may be a part of the organized dataset 780, 780a.

The search engine 750 may query the product dataset 770 to perform a lookup of a financial product name or a financial product abbreviation. The product database 770 may identify the financial product name for a received product abbreviation or a product abbreviation for a received product name. The product dataset 770 may be stored in memory remotely at the product server 760 or locally at the trading device 710.

The search engine 750 may be executed as software and/or hardware. For example, the search engine 750 may be a software module included in a trading application that is executed by a processor from memory at the trading device 710, or an independent hardware module. The search engine 750 may generate user interfaces for receiving search inputs and displaying search results to a user at the trading device 710. The search engine 750 may identify contexts that may assist a user by providing more relevant search results at the trading device 710.

The communication of information over the network 740 may be more efficient using contexts. For example, the trading device 710 may allow a user to identify more relevant tradeable objects by sending fewer queries or other requests (e.g., requests to retrieve market data from exchanges 730 to 730n) over a network, such as the network 740.

Some of the described figures depict example block diagrams, systems, and/or flow diagrams representative of methods that may be used to implement all or part of certain embodiments. One or more of the components, elements, blocks, and/or functionality of the example block diagrams, systems, and/or flow diagrams may be implemented alone or in combination in hardware, firmware, discrete logic, as a set of computer readable instructions stored on a tangible computer readable medium, and/or any combinations thereof, for example.

The example block diagrams, systems, and/or flow diagrams may be implemented using any combination of application specific integrated circuit(s) (ASIC(s)), programmable logic device(s) (PLD(s)), field programmable logic device(s) (FPLD(s)), discrete logic, hardware, and/or firmware, for example. Also, some or all of the example methods may be implemented manually or in combination with the foregoing techniques, for example.

The example block diagrams, systems, and/or flow diagrams may be performed using one or more processors, controllers, and/or other processing devices, for example. For example, the examples may be implemented using coded instructions, for example, computer readable instructions, stored on a tangible computer readable medium. A tangible computer readable medium may include various types of volatile and non-volatile storage media, including, for example, random access memory (RAM), read-only memory (ROM), programmable read-only memory (PROM), electrically programmable read-only memory (EPROM), electrically erasable read-only memory (EEPROM), flash memory, a hard disk drive, optical media, magnetic tape, a file server, any other tangible data storage device, or any combination thereof. The tangible computer readable medium is non-transitory.

Further, although the example block diagrams, systems, and/or flow diagrams are described above with reference to the figures, other implementations may be employed. For example, the order of execution of the components, elements, blocks, and/or functionality may be changed and/or some of the components, elements, blocks, and/or functionality described may be changed, eliminated, sub-divided, or combined. Additionally, any or all of the components, elements, blocks, and/or functionality may be performed sequentially and/or in parallel by, for example, separate processing threads, processors, devices, discrete logic, and/or circuits.

While embodiments have been disclosed, various changes may be made and equivalents may be substituted. In addition, many modifications may be made to adapt a particular situation or material. Therefore, it is intended that the disclosed technology not be limited to the particular embodiments disclosed, but will include all embodiments falling within the scope of the appended claims.

The invention claimed is:

1. A method comprising:
receiving, by a trading device, a user-provided a search input at a search field generated as part of a user interface of the trading device, wherein the search input concludes with a delimiter;
defining, in response to receiving the delimiter, a context filter that identifies a context in the search input, and wherein the context identified in the defined context filter corresponds to a subset of search results to be retrieved from an organized dataset by the trading device;
submitting, by the trading device in communication with the organized data set, a query according to the context filter to retrieve the subset of search results from the organized dataset that corresponds to the context identified in the defined context filter;
displaying, by the trading device, a plurality search results corresponding the subset of search results returned from the organized dataset that corresponds to the context identified in the defined context filter;
receiving, by the trading device, a second search input at the search field generated as part of the user interface of the trading device, wherein the second search input concludes with a second delimiter and defines a second context filter, and wherein the first and second context filters are displayed in the search field; and
displaying, by the trading device, a second subset of the plurality of search results, wherein the second subset of the plurality search results represents an organized display of search results from the organized dataset based on the context filter and the second context filter displayed in the search field.

2. The method of claim 1, further comprising:
identifying, by user interface portion of the trading device, a selection of a tool to be generated to display market data from at least one electronic exchange, wherein the tool comprises an application or a display window for displaying the market data from the at least one electronic exchange;
receiving, by the trading device, the market data from the at least one electronic exchange; and
display, by the trading device, the market data from the at least one electronic exchange in the tool.

3. The method of claim 2, wherein the tool resides at the trading device, and wherein the tool is a trading tool.

4. The method of claim 1, wherein the context is associated with a context type, and wherein the method further comprises:
identifying the context type from a group consisting of at least one of electronic exchanges, financial product types, financial products, or tool types; and
displaying, by the trading device, the context type to identify the context type associated with the context.

5. The method of claim 1, wherein the subset of search results comprise at least one of a subset of financial products or a subset of contracts.

6. The method of claim 1 further comprising:
generating, by the user interface of the trading device, an icon for the context filter in response to receiving the at least one delimiter; and
displaying, by the trading device, the icon in the search field.

7. The method of claim 6 further comprising:
receiving each character of the plurality of characters as the search input at the search field; and
upon receiving each character of the plurality of characters, displaying a plurality of contexts in real-time for defining the context filter, wherein the plurality of contexts include the context that is identified in the context filter.

8. A non-transitory computer readable medium having stored therein instructions executable by a processor and including instructions executable to:
receive a user-provided a search input at a search field generated as part of a user interface of the trading device, wherein the search input concludes with a delimiter;
define, in response to receiving the delimiter, a context filter that identifies a context in the search input, and wherein the context identified in the defined context filter corresponds to a subset of search results to be retrieved from an organized dataset by the trading device;
submit, to the organized data set, a query according to the context filter to retrieve the subset of search results from the organized dataset that corresponds to the context identified in the defined context filter;
display a plurality search results corresponding the subset of search results returned from the organized dataset that corresponds to the context identified in the defined context filter;
receive a second search input at the search field generated as part of the user interface of the trading device, wherein the second search input concludes with a second delimiter and defines a second context filter, and wherein the first and second context filters are displayed in the search field; and
display a second subset of the plurality of search results, wherein the second subset of the plurality search results represents an organized display of search results from the organized dataset based on the context filter and the second context filter displayed in the search field.

9. The non-transitory computer readable medium of claim 8, further including instructions executable to:

identify a selection of a tool to be generated to display market data from at least one electronic exchange, wherein the tool comprises an application or a display window for displaying the market data from the at least one electronic exchange;

receive the market data from the at least one electronic exchange; and display, by the trading device, the market data from the at least one electronic exchange in the tool.

10. The non-transitory computer readable medium of claim 9, wherein the tool resides at the trading device, and wherein the tool is a trading tool.

11. The non-transitory computer readable medium of claim 8, wherein the context is associated with a context type, and further including instructions executable to:

identify the context type from a group consisting of at least one of electronic exchanges, financial product types, financial products, or tool types; and display the context type to identify the context type associated with the context.

12. The non-transitory computer readable medium of claim 8, wherein the subset of search results comprise at least one of a subset of financial products or a subset of contracts.

13. The non-transitory computer readable medium of claim 8 further including instructions executable to:

generate an icon for the context filter in response to receiving the at least one delimiter; and display the icon in the search field.

14. The non-transitory computer readable medium of claim 13 further including instructions executable to:

receive each character of the plurality of characters as the search input at the search field; and upon receiving each character of the plurality of characters, display a plurality of contexts in real-time for defining the context filter, wherein the plurality of contexts include the context that is identified in the context filter.

15. A system including:

a trading device having a processor and a memory storing instructions executable by the processor and including instructions executable to:

receive a user-provided a search input at a search field generated as part of a user interface of the trading device, wherein the search input concludes with a delimiter;

define, in response to receiving the delimiter, a context filter that identifies a context in the search input, and wherein the context identified in the defined context filter corresponds to a subset of search results to be retrieved from an organized dataset by the trading device;

submit, to the organized data set, a query according to the context filter to retrieve the subset of search results from the organized dataset that corresponds to the context identified in the defined context filter;

display a plurality search results corresponding the subset of search results returned from the organized dataset that corresponds to the context identified in the defined context filter;

receive a second search input at the search field generated as part of the user interface of the trading device, wherein the second search input concludes with a second delimiter and defines a second context filter, and wherein the first and second context filters are displayed in the search field; and display a second subset of the plurality of search results, wherein the second subset of the plurality search results represents an organized display of search results from the organized dataset based on the context filter and the second context filter displayed in the search field.

16. The non-transitory computer readable medium of claim 15, further including instructions executable to:

identify a selection of a tool to be generated to display market data from at least one electronic exchange, wherein the tool comprises an application or a display window for displaying the market data from the at least one electronic exchange;

receive the market data from the at least one electronic exchange; and display, by the trading device, the market data from the at least one electronic exchange in the tool.

17. The non-transitory computer readable medium of claim 16, wherein the tool resides at the trading device, and wherein the tool is a trading tool.

18. The non-transitory computer readable medium of claim 15, wherein the context is associated with a context type, and further including instructions executable to:

identify the context type from a group consisting of at least one of electronic exchanges, financial product types, financial products, or tool types; and display the context type to identify the context type associated with the context.

19. The non-transitory computer readable medium of claim 15, wherein the subset of search results comprises at least one of a subset of financial products or a subset of contracts.

20. The non-transitory computer readable medium of claim 15 further including instructions executable to:

generate an icon for the context filter in response to receiving the at least one delimiter; and display the icon in the search field.

* * * * *